United States Patent [19]

Murashiro et al.

[11] Patent Number: 5,529,717
[45] Date of Patent: Jun. 25, 1996

[54] SMECTIC C LIQUID CRYSTAL COMPOSITION AND A LIQUID CRYSTAL DISPLAY ELEMENT

[75] Inventors: Katsuyuki Murashiro; Eiji Okabe; Makoto Kikuchi; Mayumi Tanabe; Masatoshi Fukushima; Shinichi Saito, all of Chiba-ken; Hitoshi Takeda, Nara-ken; Makoto Shiomi, Nara-ken; Takashi Kaneko, Nara-ken; Motonari Matsuki, Nara-ken; Mitsuhiro Koden, Nara-ken, all of Japan

[73] Assignees: Chisso Corporation; Sharp Kabushiki Kaisha, both of Osaka, Japan

[21] Appl. No.: 269,017

[22] Filed: Jun. 30, 1994

[30] Foreign Application Priority Data

Jun. 30, 1993 [JP] Japan .................................. 5-162554
Jun. 28, 1994 [JP] Japan .................................. 6-146295

[51] Int. Cl.$^6$ .............................. C09K 19/34; G02F 1/13
[52] U.S. Cl. ...................................... 252/299.61; 359/104
[58] Field of Search .......................................... 252/299.61

[56] References Cited

U.S. PATENT DOCUMENTS

| | | | |
|---|---|---|---|
| 4,846,560 | 7/1989 | Tsuboyama et al. | 359/56 X |
| 4,952,699 | 8/1990 | Yong et al. | 548/136 |
| 5,034,151 | 7/1991 | Shinjo et al. | 252/299.61 |
| 5,109,291 | 4/1992 | Inaba | 359/56 |
| 5,143,642 | 9/1992 | Krause et al. | 252/299.61 |
| 5,200,109 | 4/1993 | Iwaki et al. | 252/299.61 |
| 5,250,221 | 10/1993 | Yamashita et al. | 252/299.63 |

FOREIGN PATENT DOCUMENTS

| | | |
|---|---|---|
| 0036678 | 9/1981 | European Pat. Off. |
| 0332024 | 9/1989 | European Pat. Off. |
| 0335348 | 10/1989 | European Pat. Off. |
| 0406705 | 1/1991 | European Pat. Off. |
| 0458347 | 11/1991 | European Pat. Off. |
| 0541081 | 5/1993 | European Pat. Off. |
| WO88/08019 | 10/1988 | WIPO . |

*Primary Examiner*—Gary Geist
*Assistant Examiner*—C. Harris
*Attorney, Agent, or Firm*—Wenderoth, Lind & Ponack

[57] ABSTRACT

A composition containing a smectic C compound, having a $\Delta\epsilon$ of negative value and enabling to effect a high speed response; a ferroelectric chiral smectic C liquid crystal composition using the same; and a ferroelectric liquid crystal display device using the ferroelectric chiral smectic C liquid crystal composition are provided, which composition containing a smectic C compound comprises at least one compound expressed by the formula (I)

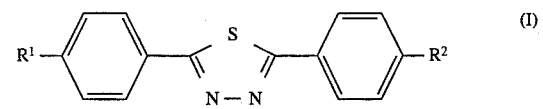

wherein $R^1$ and $R^2$ each represent different linear alkyl groups of 1 to 9 C, and at least one compound expressed by the formula (II)

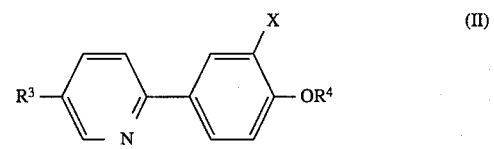

wherein $R^3$ and $R^4$ each represent the same or different linear alkyl groups of 1 to 18 C and X is H or F.

13 Claims, 12 Drawing Sheets

DRIVING WAVEFORM (C)

SMECTIC C LIQUID CRYSTAL COMPOSITION AND A LIQUID CRYSTAL DISPLAY ELEMENT

BACKGROUND OF THE INVENTION

1. Field of the Invention

This invention relates to a smectic C liquid crystal compound and its composition. More particularly, it relates to a smectic C liquid crystal compound and its composition and a ferroelectric smectic C liquid crystal composition using the same and further a light-switching element using the composition.

2. Description of the Related Art

Liquid crystal compositions have been broadly used as a display element material. Most of the current liquid crystal display elements are those of TN type display mode, and this display mode utilizes nematic phase.

The TN type display mode used for the liquid crystal display is roughly classified into two modes. One mode is an active matrix mode having switching elements fixed to the respective pixels. An example of this mode is a mode using a thin film transistor (TFT). The display grade has reached a level matching that of CRT (cathod ray tube), but it is difficult to bring the picture surface into a large scale and the cost therefor is high.

Another mode is STN (super twisted) mode. The contrast and the visual sensation-dependency have been improved as compared with those of conventional simple matrix mode, but the display grade has not yet reached the level of CRT, but its cost is cheap. These two modes have a merit and a demerit when its grade and production cost are taken into consideration.

A mode expected ten years ago to solve the two problems is a mode of ferroelectric liquid crystal (FLC). At present, what is merely called FLC, refers to a surface-stabilized ferroelectric liquid crystal (SSFLC). This SSFLC was proposed by A. Clark and S. T. Lagerwall (see Applied Physics Letters, 36, 899, 1980). Since then, it has been called a liquid crystal of the next generation, and its commercialization has been tried by appliance makers and material makers, as well as improvement of the characteristics and commercialization have been made.

Because, ferroelectric liquid crystal elements are provided with the following characteristics in principle:

(1) high speed response properties, (2) good memory properties, and (3) broad viewing angle.

The above characteristics suggest a possibility of SSFLC into a large capacity display and have made SSFLC very attractive.

However, as the research has advanced, problems to be solved have been clarified.

Among the problems, a stabilized exhibition of memory is the first problem. As the causes of the difficulty in the stabilized exhibition of memory, non-uniformity of smectic layer structure (for example, twisted alignment, chevron structure) and occurrence of the inside electric field considered to originate from the excess spontaneous polarization, etc. have been considered.

As a means for exhibiting stabilized memory properties, a method of using a ferroelectric liquid crystal composition having a negative dielectric anisotropy has been proposed (see Paris Liquid Crystal Conference, p. 217 (1984)). This method has been referred to as AC stabilizing effect.

Liquid crystal molecules having a negative $\Delta\epsilon$ value have such a property that when an electric field is impressed in a vertical direction to the electrode in a cell subjected to a homogeneous alignment treatment, the molecules are directed in a state parallel to the glass substrate (the parallel axis of the molecules is directed vertically to the direction of the electric field). When a low frequency electric field is impressed, the spontaneous polarization replies to the electric field; hence when the direction of the electric field is inverted, the liquid crystal molecules, too, follow the inversion and move to another stabilized state, where they become a state parallel to the substrate due to the effect of $\Delta\epsilon$. Whereas, when a high frequency electric field is impressed, the spontaneous polarization cannot follow the inversion, but only $\Delta\epsilon$ is effected; hence even when the direction of the electric field is inverted, the liquid crystal molecules do not move and become parallel to the substrate, as they are. This is a mechanism of exhibiting the memory properties utilizing an AC stabilizing effect. A high contrast is thereby obtained. This concrete example has already been reported (see SID '85 digest, p.128, 1985).

Further, "a method of utilizing a liquid crystal material having a negative dielectric anisotropy" has been separately proposed by Surguy et al. (P. W. H. Surguy et al., Ferroelectrics, 122, 63, 1991). This technique is a promising one for realizing the high contrast, and P. W. Ross, Proc. SID, 217 (1992) discloses a ferroelectric liquid crystal display employing this technique. This ferroelectric liquid crystal display will be described below in more detail.

In the case of a conventional ferroelectic liquid crystal material whose dielectric anisotropy is not negative, as the voltage (V) becomes high, $\tau$ (a pulse width necessary for effecting memory) lowers monotonously. Whereas, in the case of a ferroelectric liquid crystal material having a negative anisotropy, $\tau$–V characteristic showing a minimum value ($\tau$–V min) is obtained. Surguy et al. have reported JOERS/Alvey driving method as a driving method utilizing this characteristic.

The principle of this driving method refers to a method wherein, when a voltage of |Vs−Vd| is impressed, a memory state of a ferroelectric liquid crystal element is switched, and when a voltage of |Vs+Vd| higher than the above voltage is impressed, and when a voltage of |Vd| lower than the above voltage is impressed, the memory state is not switched.

Since the ferroelectric liquid crystal material having a negative dielectric anisotropy can be applied to a display element utilizing the AC-stabilizing effect and the $\tau$ min, as described above, the above material has potentially a possibility of being practically utilizable.

However, the response speed of the ferroelectric liquid crystal material used for the above element utilizing $\tau$ min is still low. Further, Vs+Vd, too, is as high as 57.5 V to 60 V; thus it has not yet reached a practical level. According to the report of Ross et al. (P. W. Ross, Proc. SID, 217 (1992)), the driving voltage of the ferroelectric liquid crystal display prepared for trial is 55 V. As to the cost of the IC driver for driving the ferroelectric liquid crystal display, the higher the voltage, the higher the cost. Thus, the high driving voltage becomes a serious cause of increased cost. In order to prepare a ferroelectric liquid crystal display having a relatively low cost, it is necessary to drive it using a general-purpose IC driver whose cost is not so high; thus it is necessary to suppress the driving voltage down to 40 V or lower. The reason for needing a high driving voltage at the present time is that the voltage value (V min) in $\tau$–V characteristic is high; hence in order to drive the display at 40 V or lower, it is necessary to develop a ferroelectric liquid crystal material exhibiting a V min of 35 V or lower.

According to Surguy et al., V min is obtained by the following equation:

$$V_{min} = E_{min} \cdot d = P_s \cdot d/(\sqrt{3} \cdot \epsilon_o \cdot \Delta\epsilon \cdot \sin^2\theta).$$

In the above equation, E min refers to the minimum value of electric field intensity; d refers to cell thickness; Ps refers to spontaneous polarization value; $\Delta\epsilon$ refers to dielectric anisotropy; and $\theta$ refers to tilt angle. As seen from this equation, in order to make the V min a lower voltage, a larger negative dielectric anisotropy and a less spontaneous polarization value are required. However, since the response speed of the ferroelectric liquid crystal is related to the spontaneous polarization value, if the spontaneous polarization value is reduced, it is difficult to obtain a high speed response. Accordingly, for the liquid crystal material, a low viscosity material having a negative dielectric anisotropy is required.

The present inventors have already filed a patent application directed to a ferroelectric liquid crystal composition suitable to drive utilizing the AC-stabilizing effect (Japanese patent application laid-open Nos. Hei 1-168792, Hei 1-306493 and Hei 4-4290). However, the response speed thereof has not yet been fully practical.

The object of the present invention is firstly to provide a smectic C liquid crystal composition having a negative $\Delta\epsilon$ and making the high speed response possible, secondly to provide a ferroelectric chiral smectic C liquid crystal composition using the same, and thirdly to provide a liquid crystal display element using the above ferroelectric chiral smectic C liquid crystal composition and the driving method thereof.

SUMMARY OF THE INVENTION

The first object of the present invention is achieved by items (1) to (10) mentioned below.

The second object of the present invention is achieved by items (5) to (9) mentioned below.

The third object of the present invention is achieved by items (11) to (16) mentioned below.

(1) A smectic C liquid crystal composition comprising at least one member of compounds expressed by the formula (I)

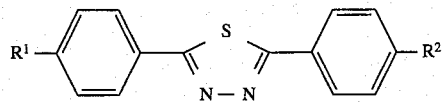

wherein $R^1$ and $R^2$ represent different linear alkyl groups of 1 to 9 carbon atoms, and at least one member of compounds expressed by the formula (II)

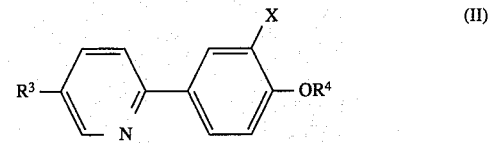

wherein $R^3$ and $R^4$ represent the same or different linear alkyl groups of 1 to 18 carbon atoms and X represents H or F.

(2) A smectic C liquid crystal composition according to item (1), wherein X of the formula (II) is F.

(3) A smectic C liquid crystal composition according to item (1) or (2), wherein the proportion of the compounds expressed by the formula (I) is 5 to 50% by weight based upon the total weight of the compounds expressed by the formula (I) and the compounds expressed by the formula (II).

(4) A smectic C liquid crystal composition according to either one of items (1) to (3), wherein the phase transition range is in the order from the higher temperature side, isotropic phase, nematic phase, smectic A phase and smectic C phase.

(5) A ferroelectric chiral smectic C liquid crystal composition, obtained by adding at least one of optically active compounds to the smectic C liquid crystal composition set forth in either one of items (1) to (4).

(6) A ferroelectric chiral smectic C liquid crystal composition according to item (5), wherein the mixing proportion of said optically active compound is 20% by weight or less based upon the weight of said smectic C liquid composition.

(7) A ferroelectric chiral smectic C liquid crystal composition according to item (5) or item (6), wherein its $\Delta\epsilon$ is negative and its absolute value is 2 or more.

(8) A ferroelectric chiral smectic C liquid crystal composition according to either one of item (5) to item (7), wherein its spontaneous polarization value is 10 $nCcm^{-2}$ or less.

(9) A ferroelectric chiral smectic C liquid crystal composition according to either one of item (5) to item (8), wherein said optically active compound is expressed by either one of the formulas (III-A) to (III-I):

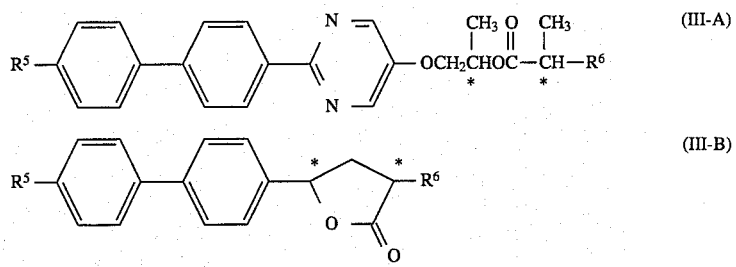

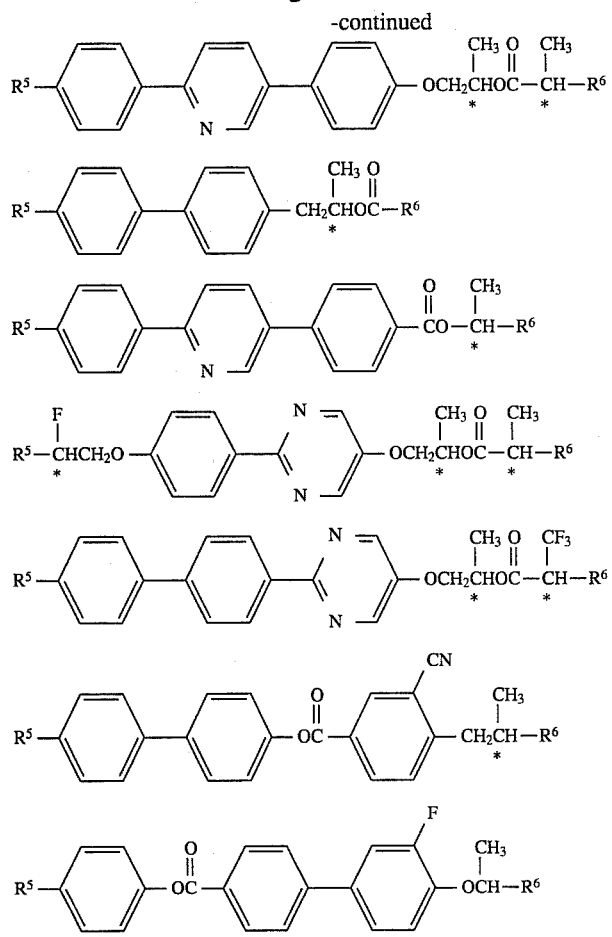

wherein $R^5$ and $R^6$ represent the same or different linear or branched alkyl group or alkoxy group of 2 to 18 carbon atoms and symbol * represents an asymmetric carbon atom.

(10) A smectic C liquid crystal compound wherein $R^1$ and $R^2$ in the compounds expressed by the formula (I) set forth in item (1) are those of linear alkyl groups each having lengths set forth in the following Table:

| $R^1$ | 5 | 6 | 6 | 7 | 8 | 8 | 8 |
|---|---|---|---|---|---|---|---|
| $R^2$ | 3 | 2 | 3 | 3 | 2 | 3 | 4 |

(11) A liquid crystal display element wherein a ferroelectric chiral smectic C liquid crystal set forth in either one of item (5) to item (9) is used.

(12) A ferroelectric liquid crystal display element according to item (11), wherein the direction of the bend of the smectic layer structure of said ferroelectric liquid crystal is the same as the pretilt direction of the liquid crystal molecules on the interface of the liquid crystal/the aligned film.

(13) A ferroelectric liquid crystal display element according to item (11) or (12), wherein the pretilt angle of liquid crystal molecules on the interface of the liquid crystal/the aligned film is 10° or less.

(14) A driving method of a ferroelectric liquid crystal display element which comprises a pair of insulating substrates each having an electrode, a ferroelectric liquid crystal composition placed between said substrates, a driving means for switching the optical axis of liquid crystals by selectively impressing a voltage onto said electrodes and a means for optically identifying the switching of said optical axis; said liquid crystal composition comprising a ferroelectric chiral smectic C liquid crystal composition having a bistable state set forth in either one of item (5) to (8), said electrodes being provided so that a plurality of scanning electrodes and a plurality of signal electrodes are arranged in the direction crossing each other, and the region where said scanning electrodes are crossed with said signal electrodes being made pixel, wherein said pixel is driven so that using voltages $V_1$, $V_2$, $V_3$ or $V_4$ satisfying the following relations, $0 < V_2 < V_4$ $V_2 - V_1 < V_4 - V_3$ when the first pulse voltage $V_1$ and the succeeding pulse voltage $V_2$, or the first pulse voltage $-V_1$ and the succeeding pulse voltage $-V_2$ are impressed onto the pixel on a selected scanning electrode, the ferroelectric liquid crystal molecules constituting a part of said pixel are brought into one stable state or another stable state depending upon the polarity of the impressed voltage, without relying on the stable state prior to the voltage impression, and when the first pulse voltage $V_3$ and the succeeding second pulse voltage $V_4$ or the first pulse voltage $-V_3$ and the succeeding second pulse voltage $-V_4$ are impressed onto the same pixel, the stable state of the ferroelectric liquid crystal molecules constituting the part of said pixel prior to the voltage impression are retained.

(15) A driving method of the ferroelectric liquid crystal display element according to item (14), wherein the ferroelectric liquid crystal in said element has a bistable state, and in the characteristic of the pulse width-pulse voltage of a monopolar pulse required for rewriting from one stable state to another, the pulse voltage affording the minimum value of the pulse width is 60 V or less.

(16) A driving method of a ferroelectric liquid crystal display element according to item (14), wherein the ferroelectric liquid crystal in said element has a bistable state, and in the characteristic of the pulse width-pulse voltage of a monopolar pulse required for rewriting from one stable state to another, the pulse voltage affording the minimum value of the phase width is 35 V or less.

BRIEF DESCRIPTION OF THE ACCOMPANYING DRAWINGS

FIG. 1 shows a phase diagram of a combination of a compound of general formula (I) (No. I-3) with a compound of general formula (II) (No. II-6).

FIG. 2 shows a phase diagram of a combination of a compound of general formula (I) wherein $R^1=R^2=6$ (No. R-3) with a compound of general formula (II) (No. II-6).

Figure 12:
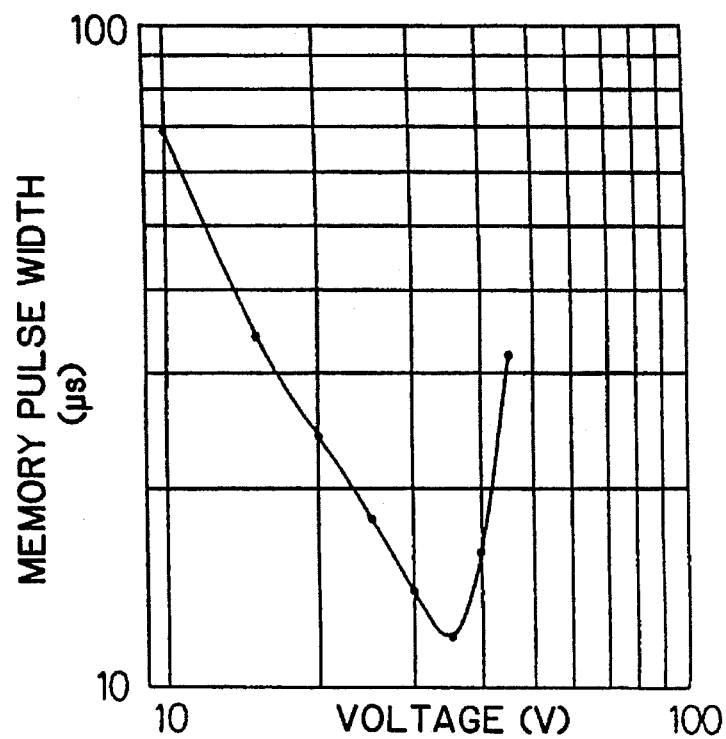
Figure 13:
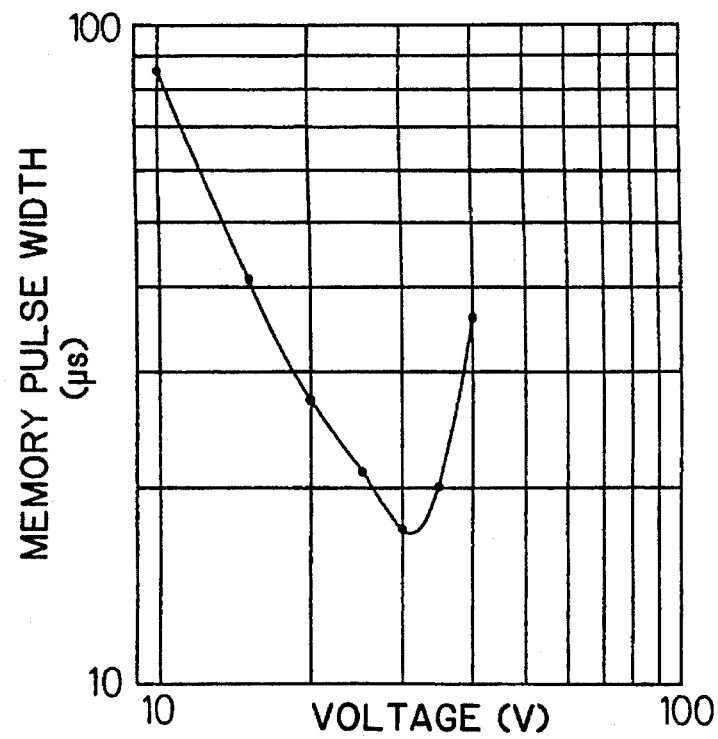

FIG. 12 and FIG. 13 each show a view illustrating the τ–V characteristic of a ferroelectric liquid crystal display element of the present invention.

Figure 14:
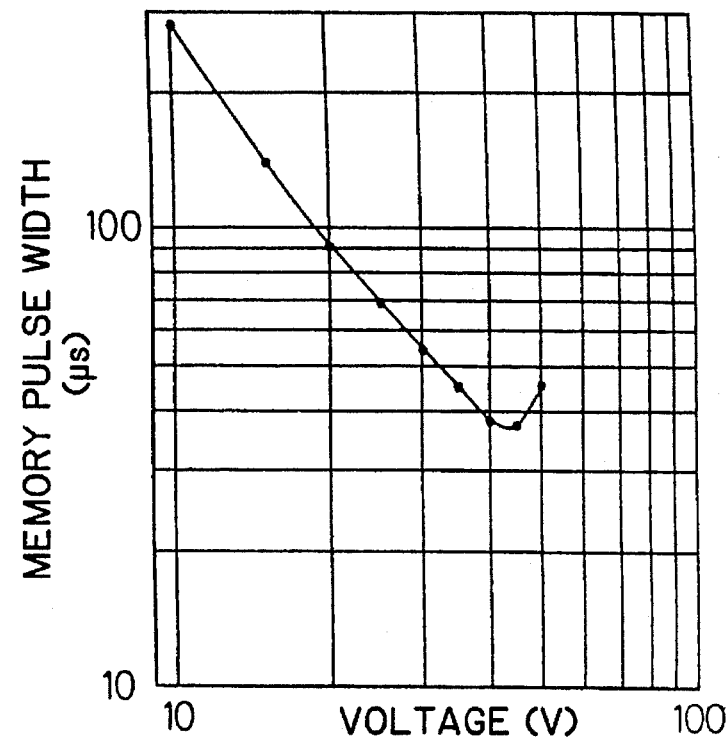
Figure 15:
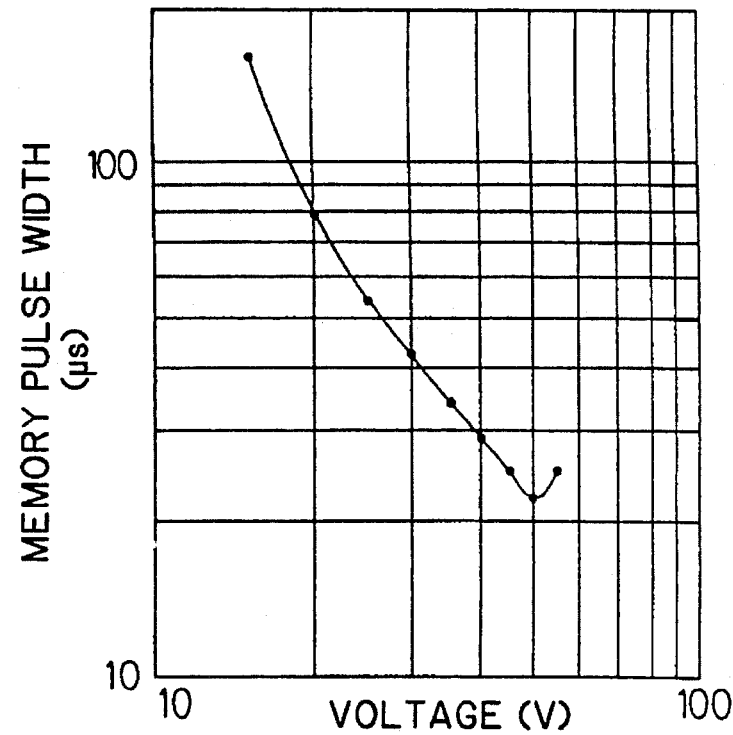

FIG. 14 and FIG. 15 each show a view illustrating the τ–V characteristic using a ferroelectric liquid crystal composition of Comparative example.

DETAILED DESCRIPTION OF PREFERRED EMBODIMENTS

The present invention will be described in more detail.

A preferable preparation of the liquid crystal compound having different alkyl chain lengths, expressed by the formula (I) is shown below.

4-Alkylbenzohydrazide 1 is preferably obtained by reacting hydrazine with a 4-alkylbenzoic acid ester. As the reaction solvent used at that time, lower alcohols such as methanol, ethanol, etc., hydrocarbons, halogenated solvents, etc. are preferably usable. The reaction temperature is preferably room temperature to 200° C., more preferably 50° C. to 100° C. Further, 1 may be also similarly obtained by reacting hydrazine with a 4-alkylbenzoic acid chloride 2, followed by separating monohydrazide.

An N-(4-alkylbenzo)-N'-(4-alkylbenzo)hydrazide 3 is obtained by reacting 1 with 2. A basic substance is used for seizing hydrogen chloride generated in the reaction. Its preferable examples are pyridine, triethylamine, etc.

As the reaction solvent, THF, toluene, etc. are preferably usable. The reaction is carried out preferably at room temperature to 150° C., more preferably at 50° to 80° C.

The objective 2-(4-alkylphenyl)-5-(4-alkylphenyl)-1,3,4-thiadiazole 4 is obtained by reacting a sulfurizing agent with dihydrazide 3. Examples of the sulfurizing agent preferably used are 2,4-bis(4-methoxyphenyl)-1,3-dithia-2,4-diphosphoethane-2,4-disulfide (Lawesson's reagent), phosphorus sulfide, single substance of sulfur, etc.

As the reaction solvent, THF, toluene, etc. are preferably usable. The reaction temperature is room temperature to 150° C., preferably 50° to 80° C.

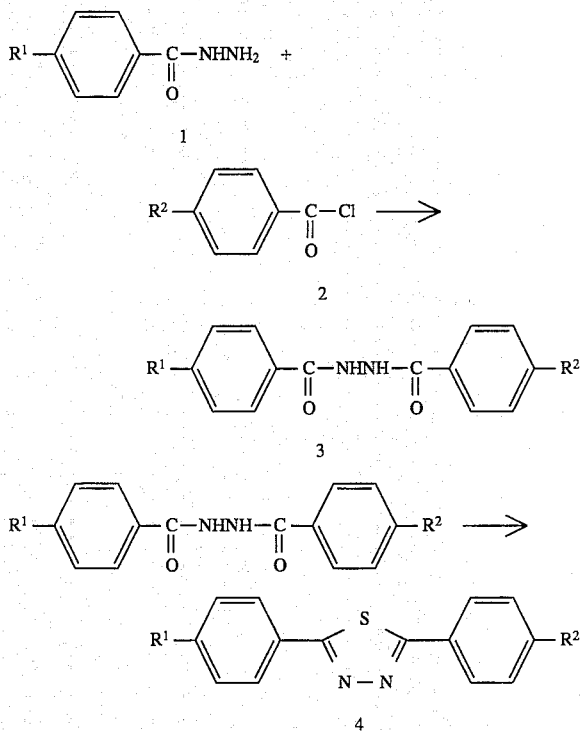

In the compound of the structure expressed by the formula (I) of the present invention, a compound having the same alkyl chain strength at both ends has been prepared by Dimitrowa et al. (J. Prakt. Chem., 322, 933 (1980)). Further, it has also been described in Flussige Kristalle in Tabellen II (p.359 (1984)) edited by Demus et al. In these documents, only compounds having the same alkyl chain length for $R_1$ and $R_2$ have been described, but compounds having different alkyl chain lengths have not been described. According to these, it is described that these documents compounds exhibit smectic A phase and nematic phase, but it is not described that they exhibit smectic C phase. Further, the compound of this structure falls within a compound claim of WO88/08019 (priority-claiming date: Apr. 16, 1987). Claim 17 of the patent has been limited only to branched alkyl. In a document of this applicant (not of the inventor), it is described citing the above-mentioned document (Flussige Kristalle in Tabellen II edited by Demus et al.), that the compound exhibits smectic A phase (Ferroelectrics, Vol. 85, p.329 (1988)). Accordingly, it is apparent that they included the compound of this structure in the compound claim without practically preparing the compound. Namely, the compound of the present invention expressed by the formula (I) is not included in WO88/08019.

Further, in order to confirm that the characteristics of the compound of the present invention are different from those of the compound of WO88/08019, the present inventors have carried out the following separate experiment:

A composition of compound (I-2) with compound (II-6) and a composition of comparative compound A with compound (II-6) were prepared. $\epsilon\|$, $\epsilon\perp$ and $\Delta\epsilon$ at $T=Tc-10$, of the respective compositions were measured. The results are shown in the following Table 1. From the results, it was found that $\Delta\epsilon$ of compound (I-2) was larger in terms of negative value, than $\Delta\epsilon$ of comparative compound A. WO88/08019 mainly claimed a compound of the type of comparative compound (A). The result of this experiment shows that an important compound was present at a part different from that intended by WO88/08019.

of 10 kinds among those of 209 kinds (since they are expressed in terms of linear and branched alkyl groups, the actual number of the compounds amount to several tens times the above number); hence it cannot be said that they are main components in Japanese patent application laid-open No. Hei 4-28787. The alkyl chain lengths of the disclosed compounds are summarized as follows.

| $R^1$ | 5 | 5 | 6 | 6 | 8 | 8 | 8 | 10 | 10 | 10 |
|---|---|---|---|---|---|---|---|---|---|---|
| $R^2$ | 5 | 7 | 4 | 6 | 5 | 8 | 9 | 6 | 8 | 10 |

While these compounds are also used in the compositions of Examples, the quantity thereof used is only 14 parts by weight even in the maximum quantity. Further, compounds which are mainly used are those wherein $R^1$ and $R^2$ have the same alkyl chain length, and the description of the physical properties, such as phase transition points, etc. is directed only to the above-mentioned one kind. In short, the preparation method having different alkyl chain lengths in the structure, the superiority of compounds having different alkyl chain lengths, difference of the physical properties in compounds having different alkyl chain strengths, etc. are not described at all. Namely, for the first time, the present invention has noted a compound expressed by the formula (I) and having different alkyl chain lengths.

The phase transition series of the compound of the present invention is generally in the order from the higher temperature side, of isotropic liquid phase, nematic phase and smectic C phase. This applies to even compounds having the same $R^1$ and $R^2$ However, the melting temperature and the

TABLE 1

$C_7H_{15}$—⟨O⟩—⟨O⟩—$OC_8H_{17}$   Compound No. (II-6)
         N       F

| Compound | Concentration of compound | 10 wt % | 30 wt % | Extrapolating value |
|---|---|---|---|---|
| (I-2) $C_3H_7$—⟨O⟩—⟨O⟩—$C_8H_{17}$ | $\epsilon\|$ | 4.4 | 4 | −4.3 |
|  | $\epsilon\perp$ | 7.3 | 7.1 |  |
|  | $\Delta\epsilon$ | −2.9 | −3.2 |  |
| Comparative compound A $C_3H_7$—⟨O⟩—⟨O⟩—$OC_8H_{17}$ | $\epsilon\|$ | 4.6 | 4.5 | −2.7 |
|  | $\epsilon\perp$ | 7.3 | 7.2 |  |
|  | $\Delta\epsilon$ | −2.7 | −2.7 |  |

The compound expressed by the formula (I) in the present invention has also been disclosed in Japanese patent application laid-open No. Hei 4-28787 which is a patent application directed to composition and element. In this patent application, the presence of smectic C phase has been described, but as a preparation example, only one kind of compounds wherein $R^1$ and $R^2$ having the same alkyl chain length ($R^1$ and $R^2$: both 6C) having already been known at that time, has been described. Further, as preferable compounds, ten kinds of compounds have been disclosed (among these kinds, 4 kinds have the same alkyl chain length). However, these compounds belong to one component among three components, and yet they are compounds temperature range of nematic phase are far different depending upon the alkyl chain length. For reference, the phase transition temperatures in the case of $R^1$ having an alkyl chain length of 8 are exemplified below.

TABLE 2

| $R^2$ | $R^2$ | Cr |  | SC |  | N |  | Iso | N phase temperature width | Compound No. |
|---|---|---|---|---|---|---|---|---|---|---|
| 8 | 2 | 70 | · | 93.2 | · | 139.4 |  |  | 46.2 | I-1 |
| 8 | 3 | 77 | · | 105.0 | · | 156.0 |  |  | 51.0 | I-2 |

TABLE 2-continued

| $R^2$ | $R^2$ | Cr | SC | N | Iso | N phase temperature width | Compound No. |
|---|---|---|---|---|---|---|---|
| 8 | 4 | 55 | 124.6 | 146.8 | | 22.2 | I-3 |
| 8 | 5 | 56 | 139.7 | 155.8 | | 16.1 | I-4 |
| 8 | 6 | 62 | 143.7 | 151.7 | | 8.0 | I-5 |
| 8 | 7 | 71 | 150.1 | 154.8 | | 4.7 | I-6 |
| 8 | 8 | 80 | 147.5 | 149.2 | | 1.7 | R-5 |

In this Table, Cr, SC, N and Iso, respectively represent crystalline phase, smectic C phase, nematic phase and isotropic liquid phase, and the numerals described below $R^1$ and $R^2$ represent the respective alkyl chain lengths of $R^1$ and $R^2$, and the numerals under Cr, SC, N and Iso represent the respective phase transition temperatures. The melting points are shown below Cr—Sc. The temperature unit is ° C.

As seen from the above Table, compounds having the same alkyl chain length have far higher melting points. Further, the larger the difference between the left and right alkyl chain lengths in the formula, the broader the temperature width of nematic phase, but this cannot be generally said. Further, a compound having a combination of $R^1$ and $R^2$ of 8 and 4 (even when the alkyl chain lengths of $R^1$ and $R^2$ are contrary to each other, the resulting compounds are the same), and a compound of a combination of $R^1$ and $R^2$ of 8 and 6, respectively exhibit melting points of 55° C. and 56° C. and belong to a class of lower melting points as for linear three-ring compound exhibiting smectic C phase.

The preserving temperature of ferroelectric liquid crystals has been said to be usually preferably −30° C. to 70° C., and the lower the melting point, the better the compound. In short, in the case of compounds exhibiting the same smectic C phase, the compounds having a lower melting point are better. Further, the phase transition series desired for ferroelectric liquid crystals is in the order from the higher temperature side, of isotropic liquid phase, cholesteric phase, smectic A phase and chiral smectic C phase. In order to realize such a phase transition series, the series is easily obtained by adding an optically active compound to a smectic C liquid crystal mixture exhibiting such a phase transition series. For this purpose, it is necessary to prepare the smectic C liquid crystal mixture exhibiting the phase transition series. Thus, as the condition required for compounds, the compounds should naturally exhibit smectic C phase, and besides it is necessary to exhibit nematic phase or smectic A phase. Ideally, it is desired that only one kind of compounds exhibits smectic C, nematic, smectic A phases within a broad range and has a low melting point. However, as practically such a compound is not existent, it is necessary to mix several kinds of compounds. The compound expressed by the formula (I) and having different alkyl chain lengths has a smectic C phase within a broad range and a broad nematic phase and further has a low melting point.

In order to prepare the above phase transition series by using the compound of the formula (I), it is necessary to mix the compound with other compounds to cause a smectic A phase to be exhibited. It has been found that compound expressed by the formula (II), for example, the following compound:

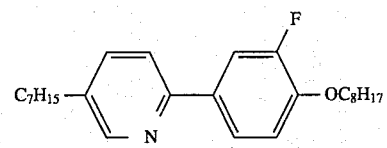

is suitable to the above purpose.

The phase transition points of the compound are as follows:

Cr 26° C. SC 46.0° C. SA 53.4° C. Iso.

The compound expressed by the formula (II) exhibits smectic C phase at such a relatively low temperature, exhibits smectic A phase and has a low melting point.

When a compound expressed by the formula (I) is combined with a compound expressed by the formula (II), it is possible to prepare a smectic C liquid crystal mixture whose phase transition series is in the order from the higher temperature side, of isotropic liquid phase, nematic phase, smectic A phase and smectic C phase.

As the compound of the formula (I), in the case of $R^1=8$ in Table 2, a compound of $R^2=4$ is most preferable, and a compound of $R^2=2$ or 5 is more preferable. Further, a compound of $R^2=3$ is also preferable if its quantity is a certain one, due to its broad nematic phase. In these cases, practically it is preferred to use a mixture obtained by mixing a compound of $R^2=4$ with compounds of $R^2=2$ and $R^2=5$ to further lower the melting point and further broaden the temperature range of nematic phase. In addition, in the case of compound of $R^2=6$, the melting point lowers, but the temperature range of nematic phase is narrow, and in the case of compound of $R^2=7$, the melting point is high and the temperature range of nematic phase is narrow; hence the properties of these compounds are inferior to those of the above compounds. Compound of $R^2=8$ wherein $R^1$ and $R^2$ have the same length has a very high melting point and a very narrow temperature range of nematic phase; hence the compound is not preferable.

For comparison, the present inventors prepared a compound wherein $R^1$ and $R^2$ have the same linear alkyl group. Its phase transition points are shown in Table 3.

TABLE 3

| $R^1$ | $R^2$ | Cr | SC | N | Iso | N phase temperature width | Compound No. |
|---|---|---|---|---|---|---|---|
| 4 | 4 | 105 | | 147.2 | | — | R-1 |
| 5 | 5 | 95 | 122.5 | 160.0 | | 37.5 | R-2 |
| 6 | 6 | 84 | 135.6 | 152.5 | | 16.9 | R-3 |
| 7 | 7 | 83 | 148.7 | 159.7 | | 11.0 | R-4 |
| 8 | 8 | 80 | 147.5 | 149.2 | | 1.7 | R-5 |

In this Table, Cr, Sc, N and Iso, respectively represent crystalline phase, smectic C phase, nematic phase and isotropic phase, and the numerals described below $R^1$ and $R^2$ represent alkyl chain lengths and the numerals below Cr, SC, N and Iso represent the respective phase transition temperatures. The melting points are shown below Cr.SC. The temperature unit is ° C.

As compared with the compounds of Table 2, it is seen that the above compound has a higher melting point and hence it is undesirable.

As seen from Table 3, when $R^1$ and $R^2$ are the same, the melting point is high. Hence such a compound is not practical. Further, from Table 2, it has been found that even in the case where $R^1$ and $R^2$ are different, there are a compound having a practical melting point and a compound having an unpractical melting point. The practically suitable alkyl chain length has been found by preparation of compounds for the first time; hence it is seen that the above fact cannot be easily anticipated from so far known examples. For example, in the above Table, in the case of $R^1=4$ and $R^2=4$, no smectic C phase is exhibited and also the melting point is very high. Further, in the case of $R^1=8$ and $R^2=8$, smectic C phase is exhibited, but the temperature range of nematic phase is only 1.7° C. and also the melting point is high. Whereas, in the case of the compound of the present invention wherein $R^1=8$ and $R^2=4$, the smectic C phase and the nematic phase are exhibited each within a broad range, and yet the melting point is very low. As described above, the compound of the present invention cannot be easily anticipated by a person of skill in the art from Japanese patent application laid-open No. Hei 4-28787; hence the compound of the present invention can be regarded as having an inventive step.

Next, preferable compounds among the compounds of the present invention expressed by the formula (I), and their phase transition temperatures are shown in the following Table 4:

TABLE 4

Particularly preferable compounds of the formula (I)

| $R^1$ | $R^2$ | Cr | SC | N | Iso | N phase temperature width | Compound No. |
|---|---|---|---|---|---|---|---|
| 8 | 2 | 70 | · 93.2 | · 139.4 | | 46.2 | I-1 |
| 8 | 3 | 68 | · 114.2 | · 152.6 | | 38.4 | I-2 |
| 8 | 4 | 55 | · 124.6 | · 146.8 | | 22.2 | I-3 |
| 8 | 5 | 56 | · 139.7 | · 155.8 | | 16.1 | I-4 |
| 5 | 3 | 68 | · 89.3 | · 164.4 | | 75.1 | I-7 |
| 6 | 2 | 62 | · 73.3 | · 139.8 | | 66.5 | I-8 |
| 6 | 3 | 55 | · 96.2 | · 153.1 | | 58.9 | I-9 |

In the Table, Cr, SC, N and Iso represent crystalline phase, smectic C phase, nematic phase and isotropic liquid phase, respectively, and the numerals below $R^1$ and $R^2$ represent alkyl chain lengths and numerals below Cr, SC, N and Iso represent the respective phase transition temperatures. The numerals below Cr—SC represent meltihg points. The temperature unit is ° C.

Further, besides, combinations of $R^1$ and $R^2$ of 7 with 2 and 7 with 4 are considered to be also preferred.

Further, usable compounds which are inferior to those of Table 4 and their phase transition temperatures are shown in Table 5.

TABLE 5

Preferable compounds expressed by the formula (I)

| $R^1$ | $R^2$ | Cr | SC | N | Iso | N phase temperature width | Compound No. |
|---|---|---|---|---|---|---|---|
| 8 | 6 | 62 | · 143.7 | · 151.7 | | 8.0 | I-5 |
| 8 | 7 | 71 | · 150.1 | · 154.8 | | 4.7 | I-6 |
| 5 | 2 | 66 | · 63.8 | · 151.1 | | 87.3 | I-10 |
| 6 | 4 | 75 | · 116.3 | · 149.4 | | 33.1 | I-11 |
| 6 | 5 | 79 | · 129.3 | · 157.6 | | 28.3 | I-12 |
| 7 | 3 | 73 | · 107.6 | · 158.3 | | 50.7 | I-13 |
| 7 | 6 | 72 | · 142.1 | · 155.5 | | 13.4 | I-14 |
| 9 | 3 | 73 | · 120.8 | · 153.1 | | 32.3 | I-15 |
| 9 | 5 | 62 | · 143.3 | · 155.8 | | 12.5 | I-16 |
| 7 | 5 | 62 | · 136.7 | · 155.9 | | 23.2 | I-17 |

In the Table, Cr, SC, N and Iso represent crystalline phase, smectic C phase, nematic phase and isotropic liquid phase, respectively, and the numerals below $R^1$ and $R^2$ represent the respective alkyl chain lengths, and numerals below Cr, SC, N and Iso represent the respective phase transition temperatures. The temperature unit is ° C. The compound expressed by the formula (II) is a compound in the composition disclosed in Japanese patent application laid-open No. Hei 2-135278 filed by the present applicant, and this compound is used in the smectic C mixture for the ferroelectric liquid crystal of the present invention and the ferroelectric chiral smectic C liquid crystal composition using the same. However, the combination of the compound of the formula (II) with the compound of the formula (I) has not been disclosed in the above Japanese patent application laid-open No. Hei 2-135278.

The compound of the formula (II) exhibits smectic C phase at a relatively low temperature and also has a relative low melting point.

Preferable compounds among those expressed by the formula (II) and their phase transition temperatures are shown in Table 6 together with compound number.

TABLE 6

Preferable compounds expressed by the formula (II)

| $R^3$ | $R^4$ | X | Cr | SB | SC | SA | Iso | Compound No. |
|---|---|---|---|---|---|---|---|---|
| 8 | 4 | H | 33 | · 57.3 | · 66.8 | · 69.4 | | II-1 |
| 9 | 5 | H | 43 | · 65.0 | 72.4 | · 74.5 | | II-2 |
| 10 | 5 | H | 44 | · 66.7 | 70.4 | · 74.4 | | II-3 |
| 7 | 6 | F | 25 | · | 40.6 | · 50.5 | | II-4 |
| 7 | 7 | F | 33 | · | 40.1 | · 50.4 | | II-5 |
| 7 | 8 | F | 26 | · | 46.0 | · 53.4 | | II-6 |
| 7 | 9 | F | 38 | · | 45.2 | · 63.6 | | II-7 |
| 8 | 8 | F | 35 | · | 49.9 | · 54.8 | | II-8 |
| 8 | 9 | F | 47 | · | 50.3 | · 55.4 | | II-9 |
| 8 | 10 | F | 44 | · | 53.2 | · 56.5 | | II-10 |

TABLE 6-continued

| Preferable compounds expressed by the formula (II) | | | | | | | |
|---|---|---|---|---|---|---|---|
| $R^3$ | $R^4$ | X | Cr | SB | SC | SA | Iso | Compound No. |
| 9 | 7 | F | 35 | · | 45.6 | · 57.6 | II-11 |
| 9 | 12 | F | 46 | · | 57.8 | · 62.1 | II-12 |
| 10 | 9 | F | 47 | · | 57.8 | · 61.4 | II-13 |

In this Table, Cr, SB, SC, SA and Iso represent crystalline phase smectic B phase, smectic C phase, smectic A phase and isotropic liquid crystal phase, respectively, and the numerals below $R^3$ and $R^4$ represent the alkyl chain lengths thereof and numerals below Cr, SB, SC and Iso represent the respective phase transition temperatures. The numerals below Cr—SC represent melting points. Temperature unit is ° C.

Next, combinations of the compounds of the formula (I) with those of the formula (II) will be described. The composition of the present invention appears to fall within the composition claimed in the above WO88/08019. However, the compound of the structure of the formula (I) is only one kind among 10 kinds of the structure exemplified as preferable ones, and as described above, there is no practical preparation example thereof. Further, as seen from Examples 7 to 64 of this patent, there is disclosed no compound having a low melting temperature and also having broad smectic C phase and nematic phase as in the compound of the present invention. The formula containing the compound of the structure of the formula (II) includes both a pyrimidine core and pyridine core, and is not limited to a compound of pyrimidine core as in the present invention. In particular, the examples have no combination with pyridine core. Whereas, compound suitable to the present invention is only compounds of the formula (II) having pyridine core. In short, it cannot be obvious from WO88/08019 that a compound of the formula (I) is combined with that of the formula (II), thereby obtaining a smectic C liquid crystal mixture suitable to an element utilizing τ min and a ferroelectric smectic C liquid crystal composition by mixing an optically active compound with the above mixture.

Figure 1:
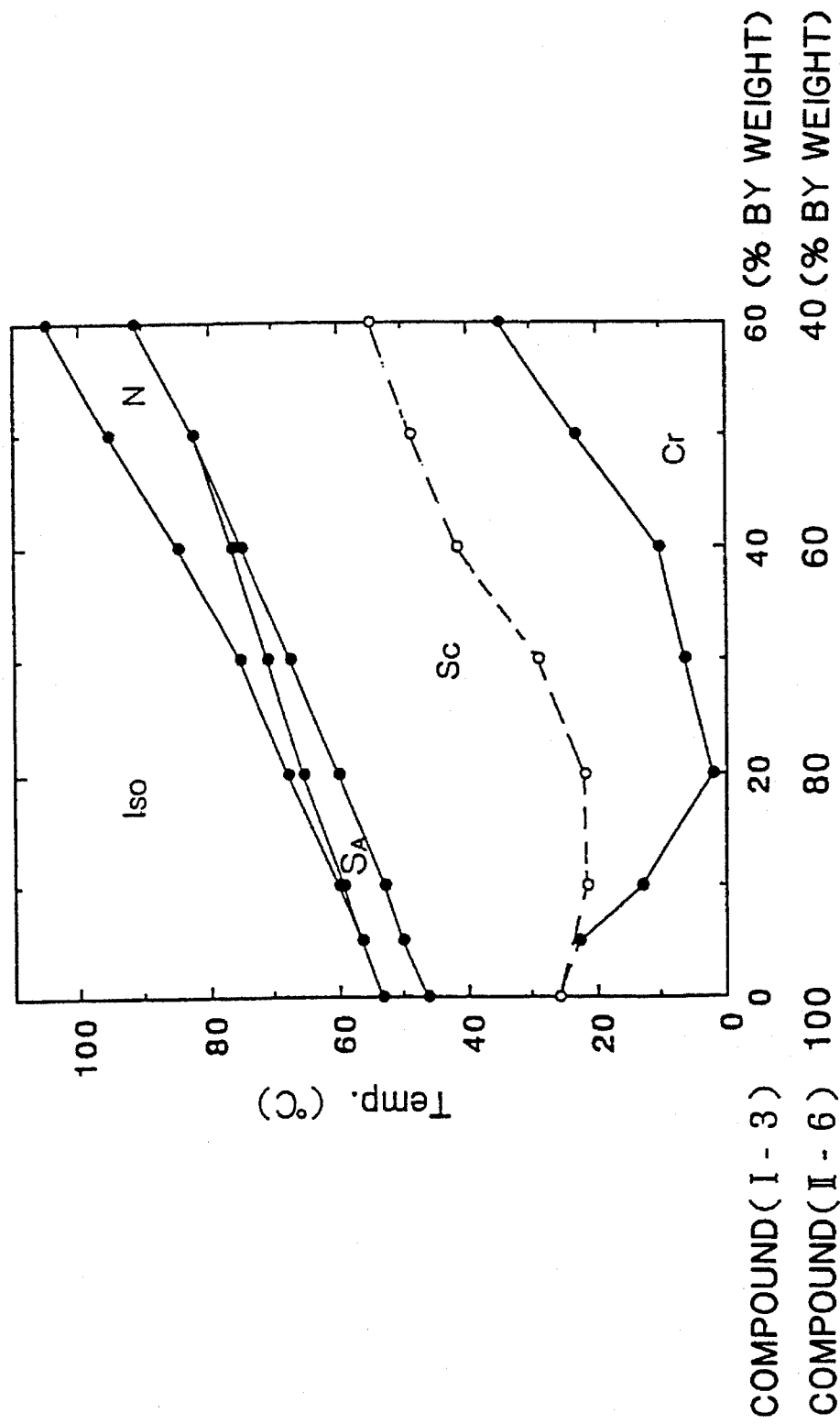
Figure 2:
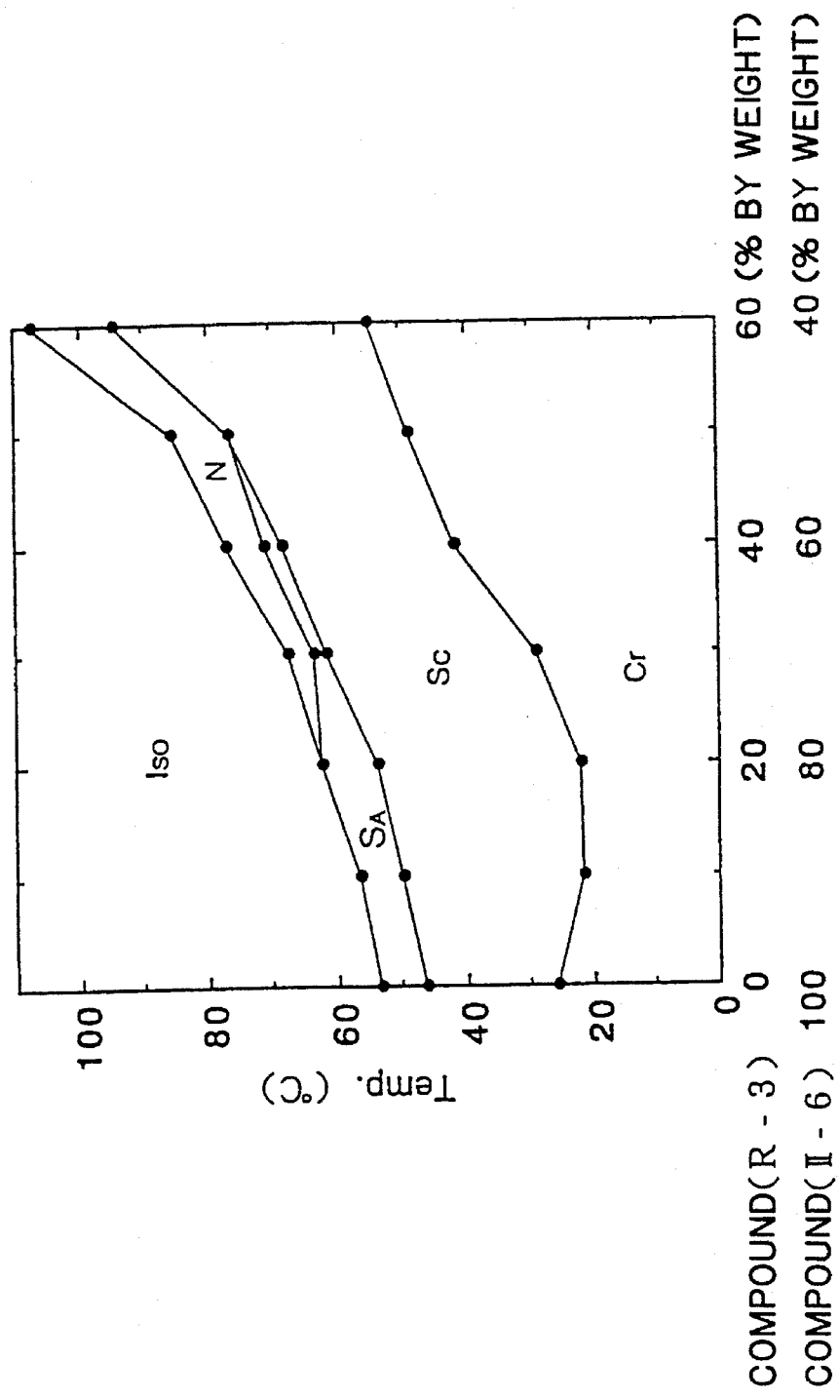

Next, the phase transition temperatures of compound of the formula (I) (NO. I-3 of Table 1 ) and compound of the formula (II) (No. II-6 of Table 5) are shown in FIG. 1. Further, for comparison, the phase transition temperatures of compound of the formula (I) wherein $R^1$=6 and $R^2$=6 and compound (No. R-3 of Table 3) and compound of the formula (II) (II-6 of Table 6) are shown in FIG. 2.

In addition, the dotted line in FIG. 1 shows the melting point in the case of a combination of a compound (No. R-3) wherein $R^1$=6 and $R^2$=6 and a compound of (No. II-6).

As described above, it can be seen that the composition of the present invention (FIG. 1) has a considerable difference in the melting point. Thus, the combination of the compounds (I) and (II) of the present invention is superior.

As seen from the above phase diagrams, when the compound of the formula (I) and that of the formula (II) of the present invention are combined, it is possible to prepare a smectic C liquid crystal mixture having a phase transition temperature range in the order from the higher temperature side, of isotropic liquid phase, nematic phase, smectic A phase and smectic C phase, and yet having a low melting point, and when an optically active compound is further added, it is possible to constitute a ferroelectric chiral smectic C liquid crystal composition having a phase transition temperature range in the order from the higher temperature side, of isotropic liquid phase, cholesteric phase, smectic A phase and chiral smectic C phase.

Further, to the above smectic C liquid crystal composition or ferroelectric chiral smectic C liquid crystal composition, it is possible to add compound other than those of the formula (I) and the formula (II) in order to broaden the phase transition temperature ranges of smectic C phase, smectic A phase and nematic phase, or to make the melting points lower, as far as the characteristics of the above compositions are not notably damaged.

As to the optically active compound used in the present invention, it does not matter which one is used, as far as it does not notably damage the characteristics when it is combined with the smectic C liquid crystal mixture of the present invention, but a compound capable of increasing the response speed is preferable.

Further, since the spontaneous polarization of the composition can be adjusted by the quantity of the optically active compound added, a compound having a low viscosity is preferable. For example, when the spontaneous polarization of the composition is intended to have a definite value, the proportion of the optically active compound used is necessarily determined by the latent spontaneous polarization (if plural compounds are used, it is determined by composition ratio therein). When compositions having the same spontaneous polarization are compared with each other, taking the tilt angle into account, then the difference between the response speeds is determined by the viscosities of the respective compositions. When the used smectic C mixtures are the same, the viscosities of the respective compositions depend upon the viscosity of the optically active compound and its concentration. In short, an optically active compound having balanced spontaneous polarization and viscosity is preferable. However, it is difficult to prepare the respective compositions so as to have all the same spontaneous polarizations and all the same tilt angles; thus in order to determine whether the optically active compound is suitable or unsuitable, it is necessary to practically prepare the compound.

The structural formulas (III-A) and (III-B) of preferable optically active compounds used in the present invention and representative compounds thereof are exemplified below.

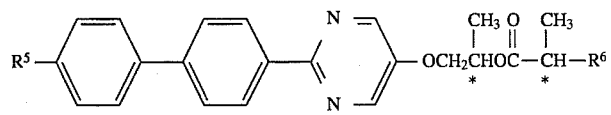 (III-A)
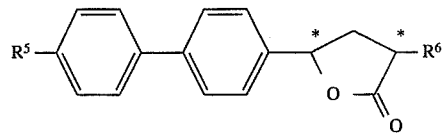 (III-B)
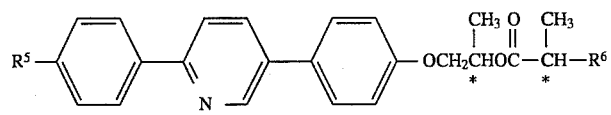 (III-C)
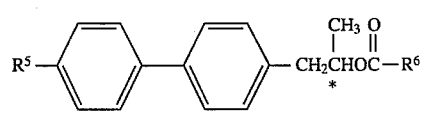 (III-D)
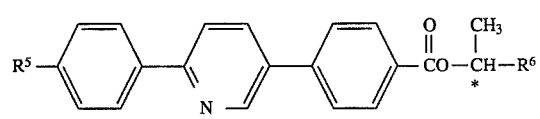 (III-E)
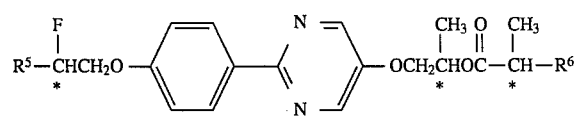 (III-F)
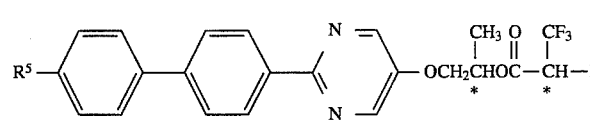 (III-G)
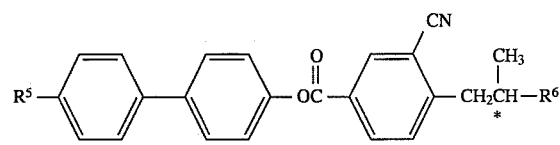 (III-H)
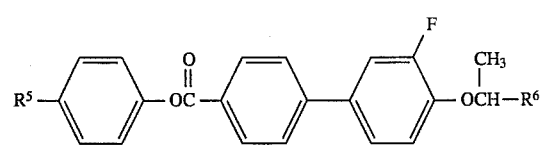 (III-I)
Compound No.
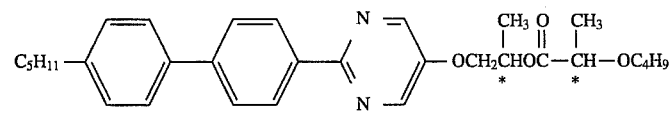 (III-1)
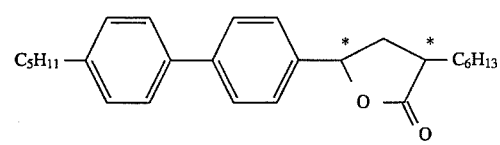 (III-2)
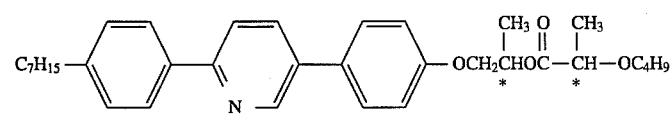 (III-3)
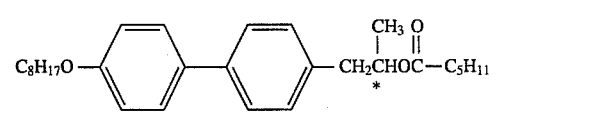 (III-4)

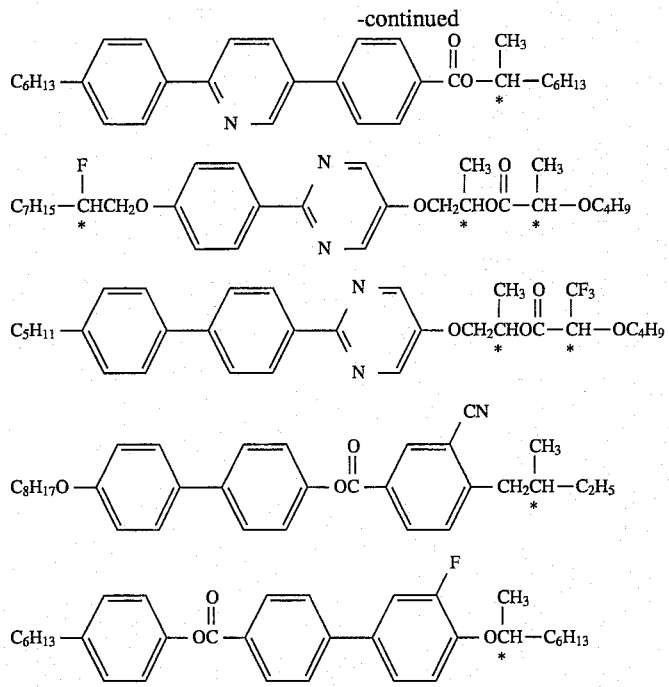

In the above formulas, $R^5$ and $R^6$ each represent a linear alkyl group or alkoxy group and * represents an asymmetric carbon atom.

As described above, the viscosity of the optically active compound is an important factor. Further, the viscosity of the smectic C liquid crystal mixture occupying a large proportion in the ferroelectric chiral smectic C liquid crystal composition is a still more important factor. In particular, when comparison is made using the same optically active compound in the same quantity, the superiority or inferiority in viscosity of the smectic C mixture appears notably. This can also be applied to comparison of the physical properties of other smectic C liquid crystal mixtures.

Conditions required for the smectic C liquid crystal mixture are those wherein the phase transition temperature range is in the order from the higher temperature side, of isotropic liquid phase, nematic phase, smectic A phase and smectic C phase; the smectic C phase is exhibited in a broad range; the melting point is low; the viscosity is low; etc.

The smectic C liquid crystal mixture obtained by mixing the compound of the formula (I) with that of the formula (II) can satisfy all of the above-mentioned conditions.

Next, the ferroelectric liquid crystal display element of the present invention will be described referring to FIG. 3.

Figure 3:
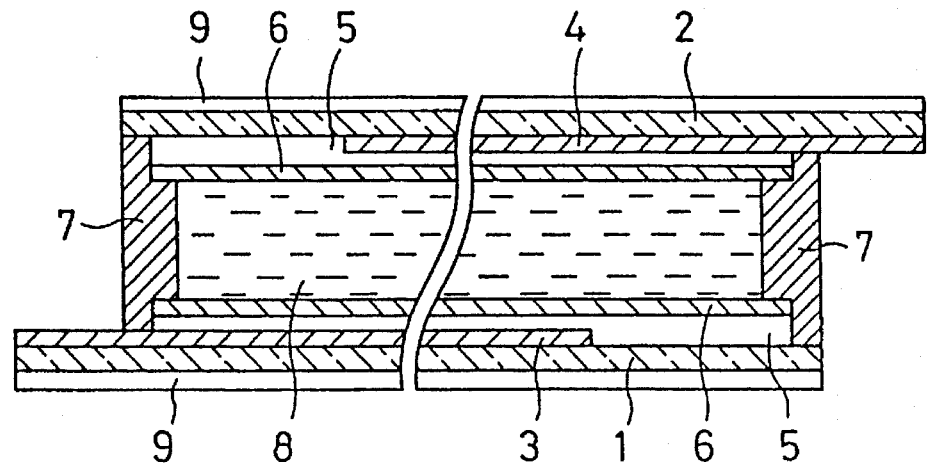
FIG. 3 shows a cross-sectional view illustrating the structure of a ferroelectric liquid crystal element using a ferroelectric liquid crystal composition of the present invention.

FIG. 3 shows a cross-sectional view illustrating the basic constitution of the liquid crystal display element using the ferroelectric liquid crystal composition of the present invention. This liquid crystal display element consists basically of a pair of insulating substrates 1 and 2 having electroconductive films 3 and 4 as electrodes; a ferroelectric liquid crystal composition 8 interposed between the substrates 1 and 2; a driving means (not shown) for switching the optical axis of liquid crystal by selectively impressing a voltage onto the above electrodes; and a polarizing plate 9 as a means for optically identifying the above switching of the optical axis. Further, in this figure, 5 refers to an insulating film, 6 refers to an alignment-controlling film and 7 refers to a sealing material. As the insulating substrates 1 and 2, a light-transmitting substrate is used, and a glass substrate is usually used. On the insulating substrates 1 and 2, $InO_3$, $SnO_2$, ITO (Indium-Tin oxide) or the like is coated according to CVD (Chemical Vapor Deposition) or a sputtering method, to form electrodes 3 and 4 having a definite pattern. The film thickness of the transparent electrodes is preferably 50 to 200 nm.

On the transparent electrodes 3 and 4, an insulating film 5 having a film thickness of 50 to 200 nm is formed. As the insulating film 5, inorganic thin films such as those of $SiO_2$, $SiNx$, $Al_2O_3$, $Ta_2O_5$, etc., organic thin films such as those of polyimide resin, photoresist resin, polymer liquid crystals, etc. can be used. In the case where the insulating film 5 is inorganic, the film can be formed according to deposition method, sputtering method, CVD method, solution-coating method, etc. Further, in the case where the film is organic, a solution dissolving an organic substance or its precursor is coated according to spinnercoating method, immersion-coating method, screen-printing method, roll-coating method, etc., followed by forming the film by curing under appropriate curing conditions (such as heating, light-irradiation, etc.), or it is possible to form the film according to deposition method, sputtering method, CVD method, LB (Langmuir-Blodgett) method, etc. This insulating film 5 may be omitted.

On the insulating film 5, an alignment-controlling film 6 having a film thickness of 10 to 100 nm is formed. In the case where the insulating film 5 is omitted as described above, the alignment-controlling film is formed directly on electroconductive films 3 and 4. As the alignment-controlling film 6, an inorganic or organic film may be used. For the inorganic alignment-controlling film, silicon oxide or the like is usable, and as a film-forming method, known methods are usable, such as oblique deposition method, rotating deposition method, etc. In the case of the organic alignment-controlling film, polyamide, polyvinyl alcohol, polyimide, etc. are usable. The film is usually rubbed. Further, in the case where polymer liquid crystal or LB film is used, alignment by way of magnetic field, alignment according to spacer edge method, etc. are applicable. Further, the film can be formed with $SiO_2$, SiOx, etc. according to deposition method, sputtering method, CVD method, etc., followed by rubbing. Then, two insulating substrates 1 and 2 are laminated onto each other by the medium of a sealer 7, followed by filling a ferroelectric liquid crystal composition 8 to make a ferroelectric liquid crystal element.

As the ferroelectric liquid crystal composition 8, those described in the above items (5) to (9) are preferably used.

Figure 4:
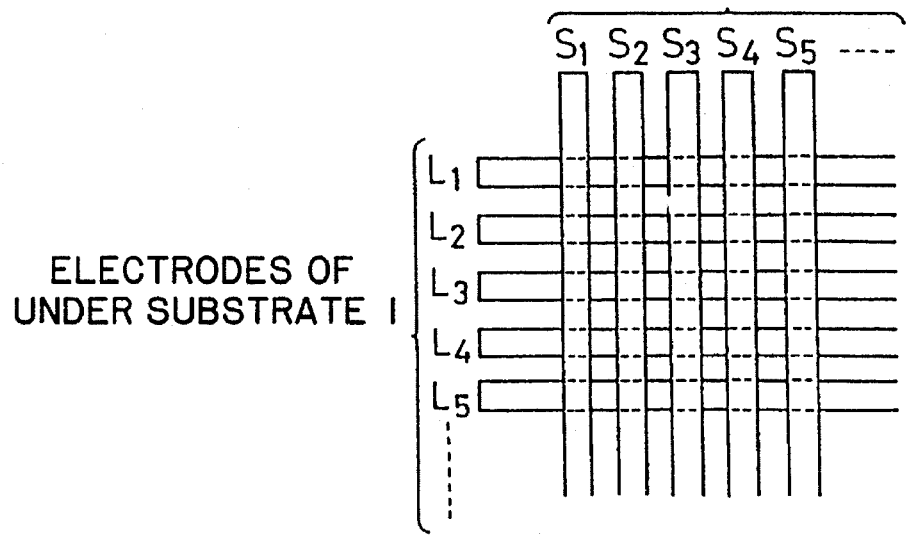
FIG. 4 shows a view typically illustrating a process for preparing a large capacity ferroelectric liquid crystal element using a ferroelectric liquid crystal element of the present invention.
Figure 5:
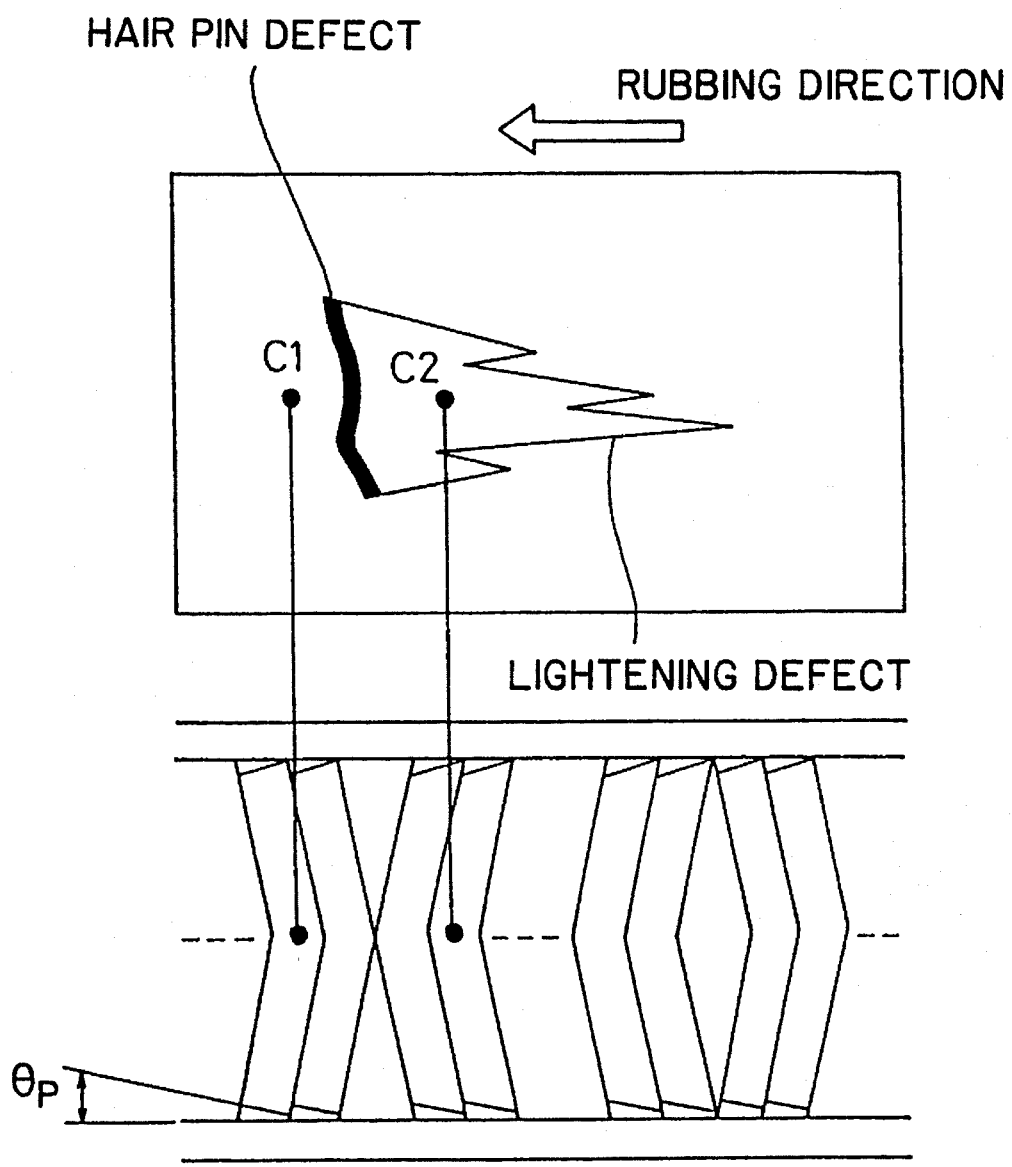
FIG. 5 shows a view illustrating C1 alignment and C2 alignment of the ferroelectric liquid crystal element.

In FIG. 3, the ferroelectric liquid crystal element has been described as regards a switching element of one pixel, but the ferroelectric liquid crystal element of the present invention is also applicable to a display device for a large capacity matrix, and in this case, as shown in a plan view of FIG. 4, there is used a typical device wherein the electrodes of the upper and lower substrates 1 and 2 are combined in the form of a matrix type. FIG. 5 is a figure for illustrating C1 alignment and C2 alignment in the ferroelectric liquid crystal display element of FIG. 4.

A preferable alignment-treating method for the above ferroelectric liquid crystal display element is a rubbing method. The rubbing method mainly includes parallel rubbing, anti-parallel rubbing, one side rubbing, etc. Parallel rubbing refers to a method wherein the upper and lower substrates are rubbed and the rubbing directions are parallel. Anti-parallel rubbing refers to a method wherein the upper and lower substrates are rubbed and the rubbing directions are anti-parallel. One side rubbing refers to a method wherein only one side substrate of the upper and lower substrates is rubbed.

The most preferred method of obtaining a uniform alignment in the present invention is a method wherein the cell treated by parallel rubbing treatment is combined with a ferroelectric liquid crystal having an INAC morphoric range. In this case, a helical structure is present in the nematic phase, but since the aligning direction of molecules is controlled from both the sides of the upper and lower substrates, a uniform alignment is liable to be obtained in the nematic phase, and when the temperatures are descending from the state down to smectic A phase and then chiral smectic C phase, alignment uniform in the normal direction to a layer is easily obtained.

However, even in the ferroelectric liquid crystal element of parallel rubbing, the aligning state formed in the chiral smectic C is never only one. The causes for which the state does not become uniform, are two.

Figure 6:
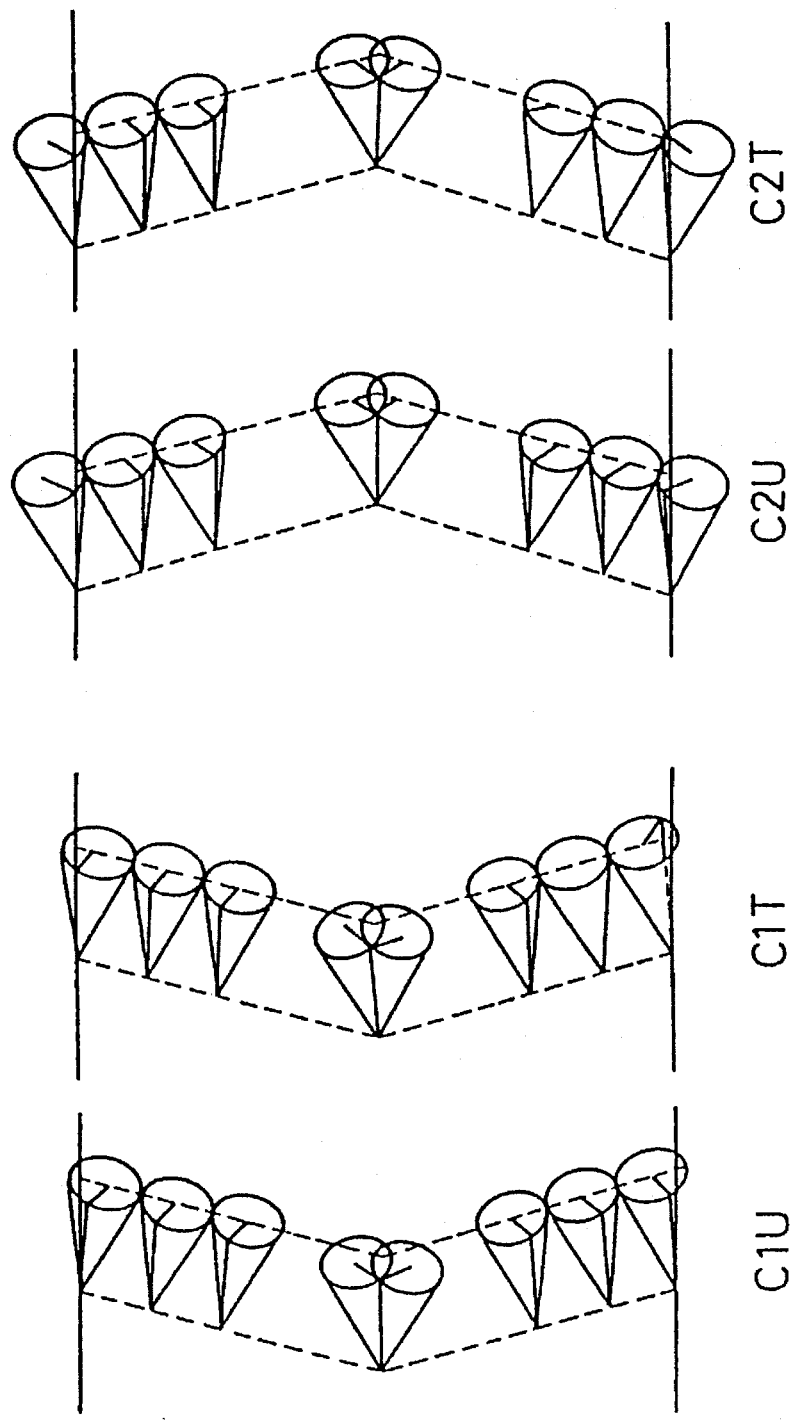
FIG. 6 shows a view illustrating the model of molecular alignment under the four aligned states of the ferroelectric liquid crystal element.

One of the two causes is directed to the bend of smectic layer. It is well known that the ferroelectric liquid crystal cell exhibits a bent layer structure (chevron structure), and as shown in FIG. 5, two domains can be present. Kobe et al. have named them C1 and C2 in relation to pretilt. Another cause is directed to uniform (U) and twist (T). "Uniform" is an alignment exhibiting extinction site and "twist" is an alignment exhibiting no extinction site. Koden et al. have reported that three alignments of C1U (C1-uniform), C1T (C1-twist) and C2 have been obtained in the ferroelectric liquid crystal cell of parallel rubbing using a high pretilt aligning film (M. Koden et al., Jpn. J. appl. phys., 30, L1823 (1991)). The present inventors further have made research in more detail, and as a result, have confirmed that there are 4 aligning states of C1U, C1T, C2U and C2T in the ferroelectric liquid crystal cell of parallel rubbing. FIG. 6 shows the molecular alignment in these aligning states.

Four aligning states obtained in the ferroelectric liquid crystal cell having a negative dielectric anisotropy have been compared, and as a result, the present inventors have found the following facts. Since C1U and C1T alignments are difficultly switched, driving is difficult. Further, C1T alignment has no extinction site; hence, even if the alignment is switched, good contrast cannot be obtained. Whereas, C2U alignment affords a good switching characteristic and contrast, and while C2T alignment does not exhibit extinction properties at the time of impressing no electric field, but when the liquid crystal material has a negative dielectric anisotropy, the above C2T alignment exhibits extinction properties as in the case of uniform alignment, at the time of impressing a suitable bias voltage; hence a good switching characteristic and contrast are obtained even by C2T alignment.

The appearance of C1 and C2 alignments is related to a pretilt angle, and C2 state can occur within a pretilt angle of 0° to 15°. When the pretilt angle is high, C2 state is only one state showing the extinction site, and this is rather preferred as reported by Koden et al. However, there is a tendency that as the pretilt angle increases, the alignment is liable to become rather C1 alignment than C2 alignment; hence the tilt angle is preferably 10° or less.

Figure 7:
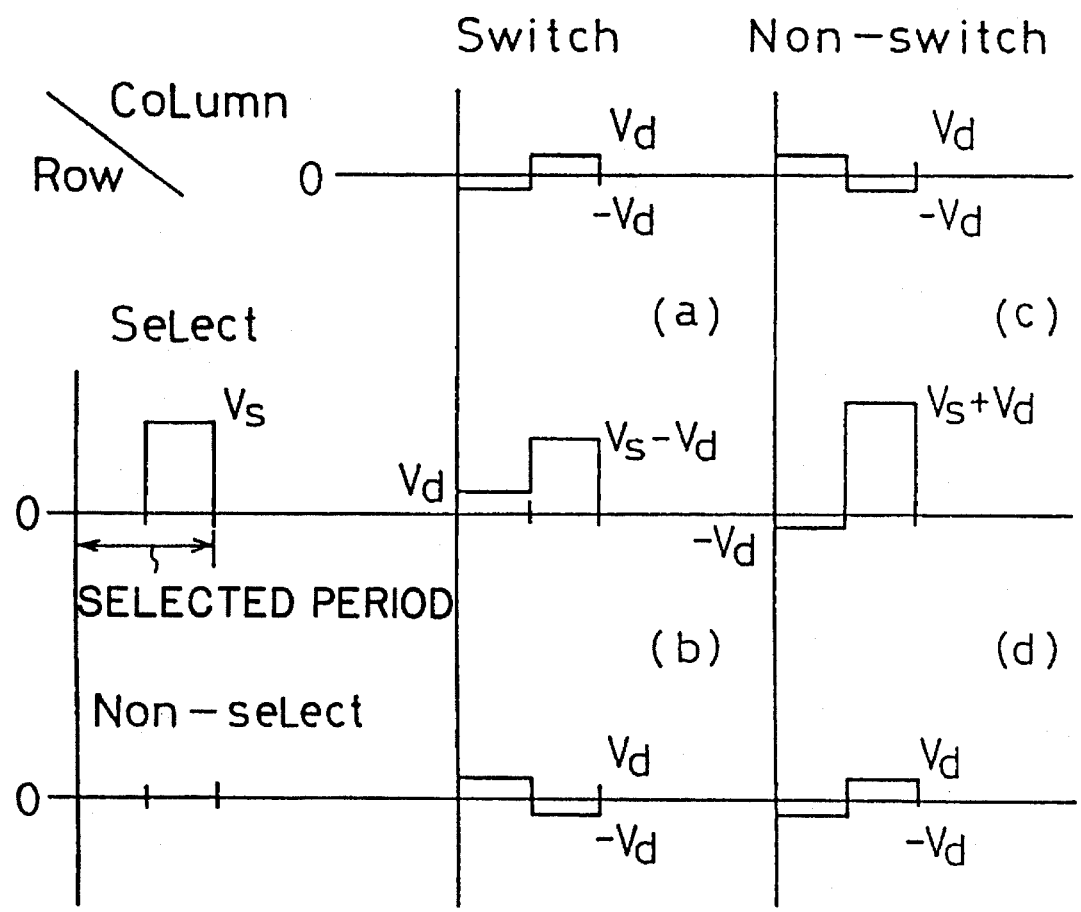
FIG. 7 shows a view illustrating the driving waveform (A) driving the ferroelectric liquid crystal element using the τ–V characteristic of the ferroelectric liquid crystal material.
Figure 8:
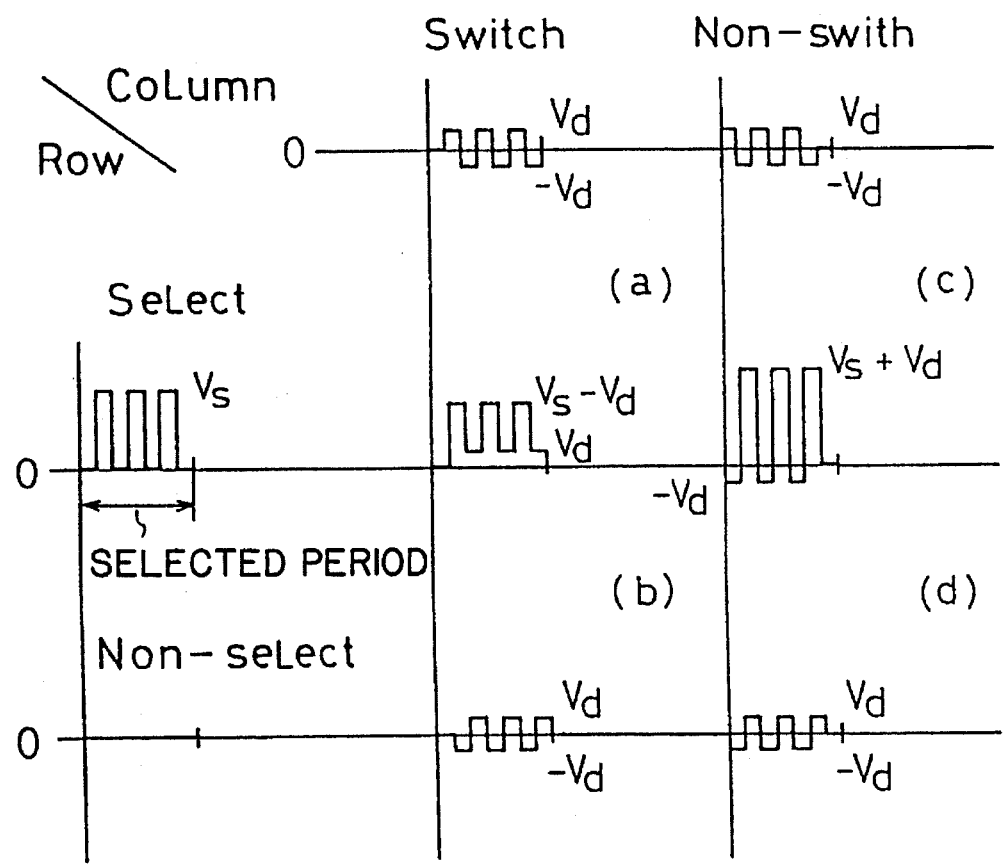
FIG. 8 shows a view illustrating the driving waveform (B) driving the ferroelectric liquid crystal element using the τ–V characteristic of the ferroelectric liquid crystal material.
Figure 9:
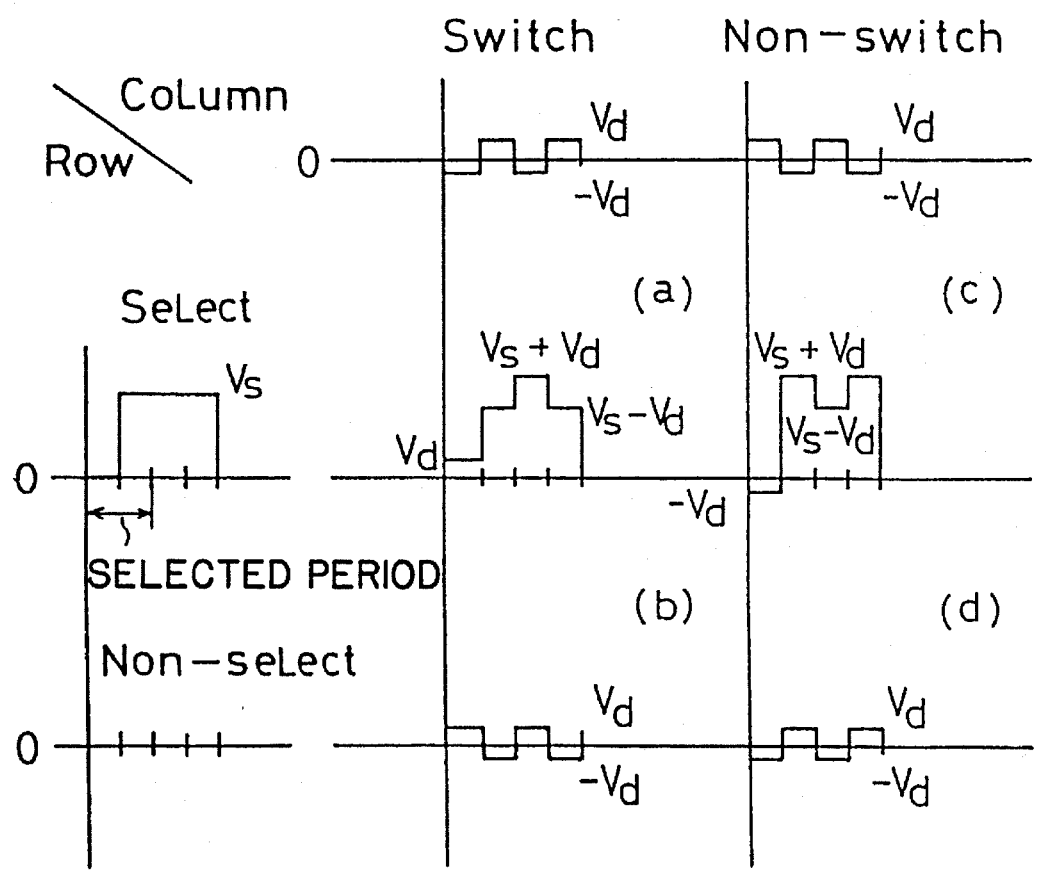
FIG. 9 shows a view illustrating the driving waveform (C) driving the ferroelectric liquid crystal element using the τ–V characteristic of the ferroelectric liquid crystal material.
Figure 10:
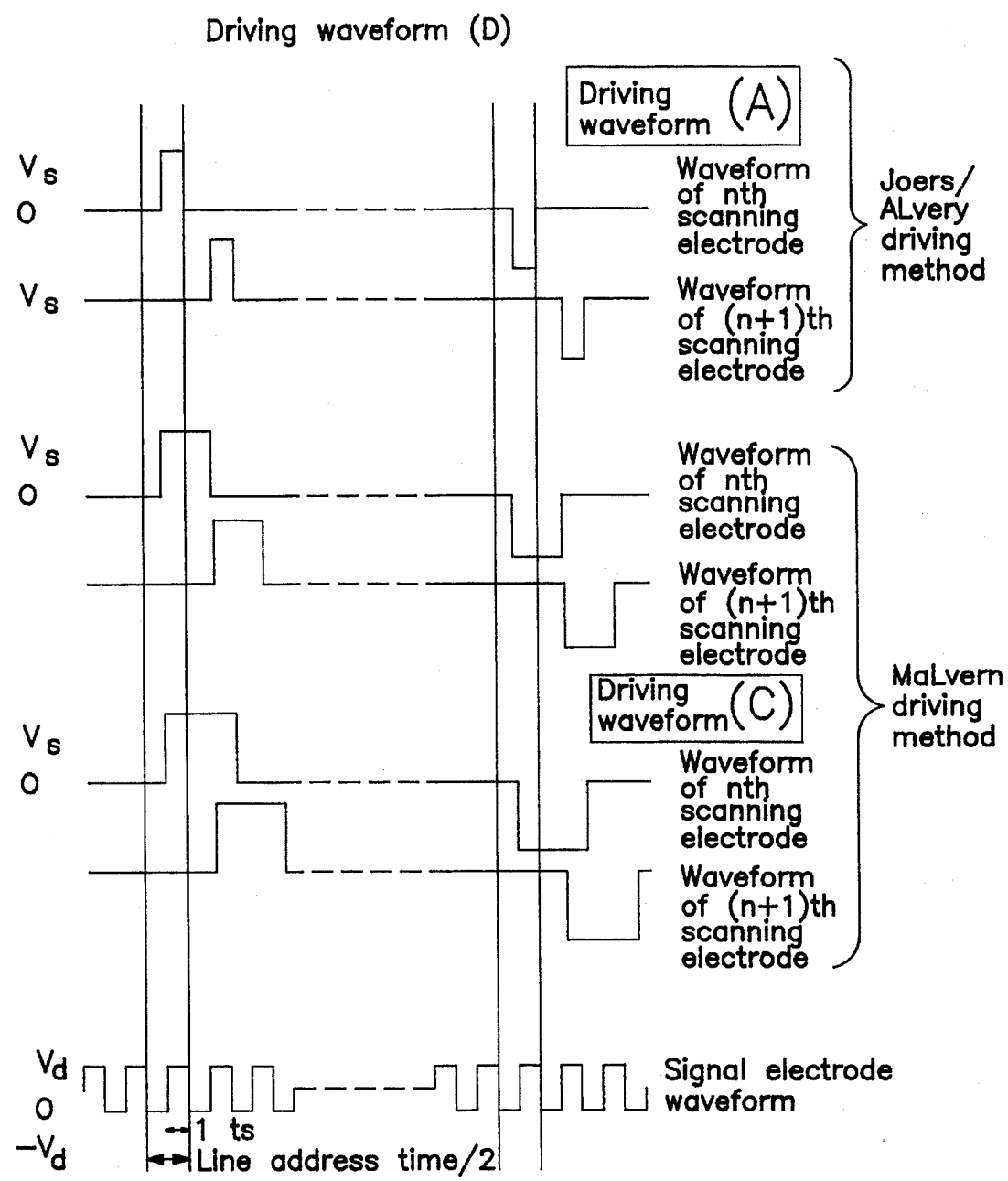
FIG. 10 shows a view illustrating the driving waveform (D) driving the ferroelectric liquid crystal element using the τ–V characteristic of the ferroelectric liquid crystal material.

Next, the driving method will be described. Of course, Joers/Alvey driving method according to the driving waveform A as shown in FIG. 7 can be used, but the driving method according to the driving waveform (B) as shown in FIG. 8 is also considered. These driving methods are a partially rewritable driving method and are preferable for preparing a display having a large display Capacity of e.g. 2,000×2,000 lines, using the above ferroelectric liquid crystal element. In the case of driving waveform (B), the waveforms of voltages impressed to pixel are expressed by (a) to (d), and since τs obtained by impressing the voltages of the waveforms (b) to (d) in the case of non-rewriting are equal, the quantities of transmitted light are equal. Hence, a good display having no flicker is obtained. Further, Malvern driving method (WO92/02925 (PCT)) whose example is a driving waveform (C) as shown in FIG. 9, is a method wherein the main pulse width can be varied so as to have an optional length, as compared with Joers/Alvey's driving method according to a driving waveform (A) wherein an 0 V part of one time slot and a main pulse part which is not an 0 V of one time slot are used as shown in FIG. 10. Hence, the above method is one of preferable methods since the timing of impressing the voltage is lapped between the electrodes whereby the line address time can be shortened.

Including the above driving method, a driving method for a ferroelectric liquid crystal material having a τ–V characteristic wherein the pulse width τ exhibits a minimum value is characterized as follows.

In these driving inethods, voltages $V_1$, $V_2$, $V_3$ or $V_4$ having the following relations are impressed to a pixel, $$0<V_2<V_4$$

$$V_2-V_1<V_4-V_3$$

and the pixel is driven so that when the first pulse voltage $V_1$ and the succeeding pulse voltage $V_2$, or the first pulse voltage $-V_1$ and the succeeding pulse voltage $-V_2$ are impressed onto a part of the pixel on a selected scanning electrode, the ferroelectric liquid crystal molecules are brought into one stable state or another stable state depending upon the polarity of the impressed voltage, whatever the stable state prior to the voltage impression, and when the first pulse voltage $V_3$ and the succeeding second pulse voltage $V_4$ or the first pulse voltage $-V_3$ and the succeeding second pulse voltage $-V_4$ are impressed onto the part of the same pixel, the stable state of the ferroelectric liquid crystal molecules prior to the voltage impression is retained.

Namely, in the initial 2 time slots of a selection period, as compared with the waveform applied for rewriting, a waveform applied for retention has a higher second pulse voltage and a larger difference between the first pulse voltage and the second pulse voltage. For example, as to such voltages, $V_1$, $V_2$, $V_3$ and $V_4$, $V_1=V_d$, $V_2=V_s-V_d$, $V_3=V_d$ and $V_4=V_s+V_d$, in the driving waveform (A) shown in FIG. 7;

$V_1=0$, $V_2=V_s-V_d$, $V_3=-V_d$ and $V_4=V_s+V_d$ in the driving waveform (B) shown in FIG. 8; and $V_1=V_d$, $V_2=V_s-V_d$, $V_3=-V_d$ and $V_4=V_s+V_d$, in the driving waveform (A) shown in FIG. 9.

In the τ–V characteristic of ferroelectric liquid crystal element, the voltage V min affording the minimum value τ min of the pulse width τ is directly related to the maximum value of the voltage impressed at the time of driving. In view of the pressure resistance of the driving circuit used for driving, a ferroelectric liquid crystal material having a V min of 60 V or lower is preferred, and in order to use a driving circuit using a general-purpose IC driver, the material having a V min of 35 V or lower is preferred. Further, in the driving of a ferroelectric liquid crystal material having a τ–V characteristic exhibiting a minimum value of pulse width τ, by optionally forming a region having different driving characteristics in the pixel, for example according to a process of modifying the element structure such as cell gap, electrode shape, etc., it is possible to use a waveform applied to rewriting at a specified part in the pixel, as a waveform applied to retention at other part in the same pixel, or to use a waveform applied to retention at a specified part in the pixel, as a waveform applied to rewriting at other part in the same pixel. Thus, it is possible to carry out graduation display.

In addition, in the description of the present invention, as one embodiment of a very preferable method utilizing the ferroelectric liquid crystal display element of the present invention, parallel rubbing, C2 alignment, a specified driving method, etc. have been mentioned, but, of course, the present invention should not be construed to be limited thereto and it goes, without saying that the above example is applicable to other types of ferroelectric liquid crystal display elements and driving methods.

Next, applicability of the present invention to liquid crystal display element utilizing τ min will be described. In a simple system wherein the layer structure has been supposed to be a book shelf structure, the following equation comes into existence (see Liquid crystals 6, No. 3, p.341 (1989)):

$$E\ min=P_s/(3^{1/2}\cdot\epsilon_0\cdot\Delta\epsilon\cdot\sin^2\theta)$$

wherein E min represents a voltage in a pulse width of minimum value, Ps represents spontaneous polarization, $\epsilon_o$ represents vacuum dielectric constant, Δε represents dielectric anisotropy and θ represents tilt angle. According to this equation, in the case where a practical voltage, e.g. E min is 40 V or lower, when a liquid crystal material having a Δε of −2 is used and a cell of 2 μm is used, the spontaneous polarization should be 7 nC/m² or less (Ferroelectrics, vol. 122, p. 63 (1991)). Since a practical layer structure is mostly a chevron structure, it is impossible to apply this, as it is, but it is possible to use it as an estimation. What is known from this equation is that the less the Ps and the larger the Δε and θ, the lower the E min.

The pulse width of the minimum value (E min) is inversely proportional to the square of spontaneous polarization (Ferroelectrics, vol. 122, p. 63 (1991)).

Figure 11:
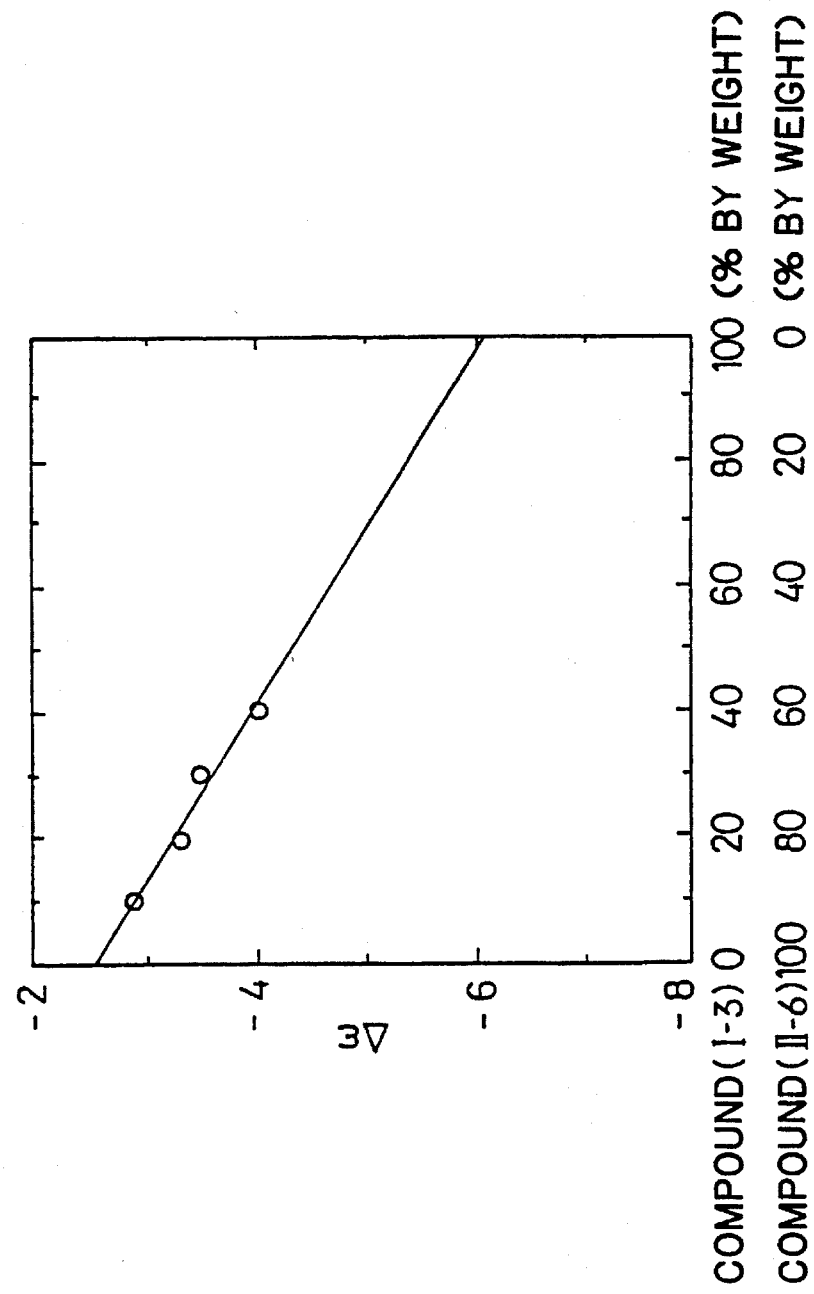
FIG. 11 shows a view illustrating the Δε of the mixed system of compound (I-3) with compound (II-6) of the present invention at room temperature.

The Δε of the mixture system. of compound (I-3) and compound (II-6) of the present invention at room temperature is shown in FIG. 11.

When Δε is extrapolated based upon FIG. 11, Δε of compound (I-3) is −6, and that of compound (II-6) is −2.5. Within a practical mixing ratio, it is considered that the Δε of the smectic C liquid crystal mixture of the present invention is within a range of about −2.5 to −5. While the Δε may be also varied depending upon the Δε of an optically active compound to be mixed, it is considered that the above value is sufficiently large in terms of negative value, when it is used for the element utilizing τ min. As to the value of the spontaneous polarization prepared using it, when a cell of an E min of 40 V and 2 μm is utilized, referring to the above equation, if the tilt angle is 20°, it is seen that the spontaneous polarization can be made 9 to 18 nC/cm², and τ min can be shortened as much. However, since τ min itself is not related only to the spontaneous polarization, but as there are factors such as viscosity, etc., anticipation is impossible. In short, even when the compositions have the same Δε, τ min varies depending upon the viscosity, tilt angle, etc. of the compositions.

τ–V curve was prepared using "CS-3000" of a trade name of product made by Chisso Corporation. As a result, even when 60 V was impressed to a cell of 2 μm at 25° C., τ min was not observed. τ min should appear in the vicinity of 44 V according to calculation. "CS-3000" has a Δε of −2.7, a tilt angle of 26° and a spontaneous polarization of 17.5 nCcm⁻². Like this, it was found that there were factors other than Δε, tilt angle and spontaneous polarization; thus, it is practically difficult to anticipate E min and τ min.

The smectic C liquid crystal composition of the present invention and the ferroelectric smectic C liquid crystal composition obtained by mixing an optically active compound with the above composition are not only suitable to an element utilizing τ min or AC stabilizing effect, but also they are usable to conventional SSFLC element.

Effectiveness of the Invention

When the compound expressed by the formula (I), of the present invention is mixed with the compound expressed by the formula (II) of the present invention, in a definite proportion, a smectic C liquid crystal composition suitable to an element utilizing τ min or AC stabilizing effect can be obtained, and further when an optically active compound is mixed with the composition, a ferroelectric liquid crystal composition suitable to the above element and a liquid crystal display element using the composition can be obtained.

EXAMPLE

The present invention will be described in more detail by way of Preparation examples and Examples, but it should not be construed to be limited thereto.

Various measurements in the present invention were carried out according to the following methods:

The phase transition temperature was measured by placing a sample on a slide glass, followed by covering it with a cover glass, placing the resulting material on a hot plate, elevating the temperature at 1° C./min. and observing under a polarizing microscope.

The melting point was measured by using a differential scanning calorimetric analysis (DSC) and elevating the temperature at 1° C./min.

The spontaneous polarization (Ps) was measured according to Sawyer-Tower method.

The tilt angle (θ) was measured by impressing a sufficiently high electric field of a critical electric field or higher, to a homogeneously aligned cell, to extinguish the helical structure, and further reversing the polarity, to obtain the rotation angle (corresponding to 2 ) at extinction site under crossed nicols.

The dielectric anisotropy (Δε) was measured by filling the respective compositions in a cell having the capacity measured in advance, provided with electrodes having a vertically aligning agent coated thereonto and having a distance of 2 μm between the electrodes, and in a cell having the capacity measured in advance, and provided with electrodes subjected to homogeneously aligning treatment and having a distance of 2 μm between the electrodes, followed by measuring and calculating the capacities of the respective cells by means of LCR meter and at 1 V and 10 KHz at 25° C.

The response time (τ) was measured by filling the respective compositions in a cell subjected to aligning treatment and having a distance of 2 μm between electrodes, impressing a square wave of Vpp=20 V and 100 Hz and observing the change in the intensity of transmitted light at that time.

The voltage (E min) in the pulse width of minimum value and the pulse width (τ min) of the minimum value were determined by filling the respective compositions in a cell provided with electrodes subjected to aligning treatment and having a distance of 2 μm between the electrodes, determining a relationship between τ and V to prepare a τ–V curve and observing the resulting curve. In this case, the pulse distance was made 100 times the pulse width (τ) (100τ) (Ferroelectrics, vol. 122, p. 63 (1991)).

Any of the measurements of the above Ps, θ, τ and τ min were carried out at 25° C., and the designation of the compounds used as the component compounds of the liquid crystal compositions in the below-mentioned Examples and Comparative examples was made under the above-mentioned compound numbers.

Preparation example 1

Preparation of 2-(4-octylphenyl)-5-(4-ethylphenyl)-1,3,4-thiazole (a compound of the formula (I) wherein $R^1$ is octyl, and $R^2$ is ethyl)

2-(4-octylphenyl)-5-(4-ethylphenyl)-1,3,4-thiazole was prepared according to the following steps 1, 2 and 3.

Step 1

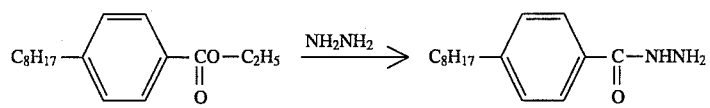

Step 2

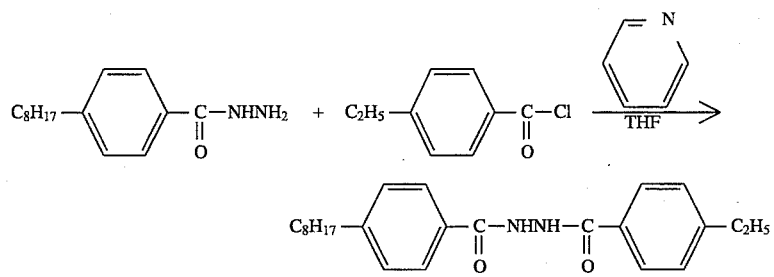

Step 3

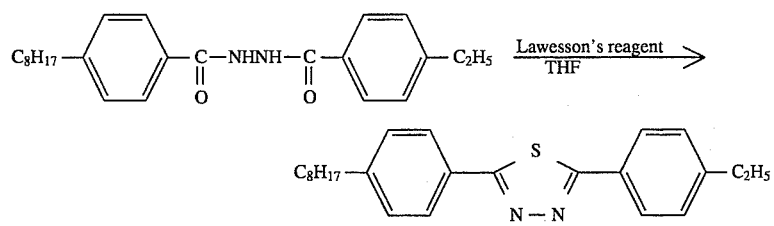

Step 1: Preparation of 4-octylbenzohydrazide THF (100 ml) was added to 4-octylbenzoic acid ethyl ester (100 g), followed by dropwise adding hydrated bydrazine (80 g), heating the mixture under reflux for 2 hours, adding ice water after completion of the reaction, filtering off deposited crystals, washing with water and recrystallizing from ethanol to obtain 72.9 g (m.p.: 100.1° to 101.2° C.).

Step 2: Preparation of N-(4-octylbenzo)-N'-(4-ethylbenzo)dihydrazide

THF (20 ml) and pyridine (4 ml) were added to the hydrazide (5.0 g) obtained at the step 1, followed by dropwise adding 4-ethylbenzoic acid chloride (4.3 g), heating the mixture under reflux for 5 hours, adding aqueous NaCl after completion of the reaction, filtering off deposited crystals and recrystallizing from ethanol, to obtain the objective compound (3.6 g).

Step 3: Preparation of 2-(4-octylphenyl)-5-(4-ethylphenyl)-1,3,4-thiadiazole

THF (30 ml) and 2,4-bis(4-methoxyphenyl)-1,3-dithia-2,4-diphosphoethane-2,4-disulfide (Lawesson's reagent) (3.7 g) were added to the dihydrazide (3.6 g) obtained at the step 2, followed by heating the mixture under reflux for 4 hours, adding water after completion of the reaction, extracting with toluene, washing the organic layer with NaOH, sodium thiosulfate and water, drying over anhydrous $MgSO_4$, distilling off the solvent, purifying the residue according to column chromatography (with toluene) and recrystallizing from ethanol, to obtain the objective compound (1.8 g).

Phase transition temperature:

Cr 70° C.   SC 93.2° C.   N 139.4° C.   Iso

Example 1

A smectic C liquid crystal mixture (a) having the following composition was prepared:

| | |
|---|---|
| Compound No. (I-2) | 5 wt. % |
| Compound No. (I-3) | 10 wt. % |
| Compound No. (I-4) | 15 wt. % |
| Compound No. (I-9) | 10 wt. % |
| Compound No. (II-5) | 20 wt. % |
| Compound No. (II-6) | 20 wt. % |
| Compound No. (II-7) | 15 wt. % |
| Compound No. (II-8) | 5 wt. % |

The phase transition temperatures and the dielectric anisotropy ($\Delta\epsilon$) of the above composition (a) are shown below.

Cr −17° C. SC 71.5° C. SA 76.0° C. N 84.2° C. Iso $\Delta\epsilon$: −4.6

Example 2

Optically active compounds were mixed with the smectic C liquid crystal mixture (a) of Example 1 in the following proportions, to prepare a ferroelectric liquid crystal composition (b):

| | |
|---|---|
| Mixture (a) | 97 wt. % |
| Compound No. (III-1) | 2 wt. % |
| Compound No. (III-4) | 1 wt. % |

The phase transition temperatures, the spontaneous polarization (Ps), the tilt angle ($\theta$), the response time ($\tau$) in the case where 20 V was impressed, the voltage (E min) in the pulse width of minimum value and the pulse width ($\tau$ min) of the minimum value, of the above composition (b) are shown below.

Phase transition temperatures

| | | | | | |
|---|---|---|---|---|---|
| Cr −28° C. | SC* 73.0° C. | SA 76.2° C. | N 85.9° C. | Iso | |
| | Ps | | 4.2 nCcm$^{-2}$ | | |
| | $\theta$ | | 32.6° | | |
| | $\Delta\epsilon$ | | −4.6 | | |
| | $\tau$ | | 85 μsec | | |
| | E min | | 21 V/μm | | |
| | $\tau$ min | | 50 μsec | | |

Comparative Example 1

A smectic C liquid crystal mixture (c) was prepared wherein the optically active compound of Example 1 of Japanese patent application laid-open No. Hei 4-4290 filed by the present inventors was excluded and the residual components were mixed in the following proportions.

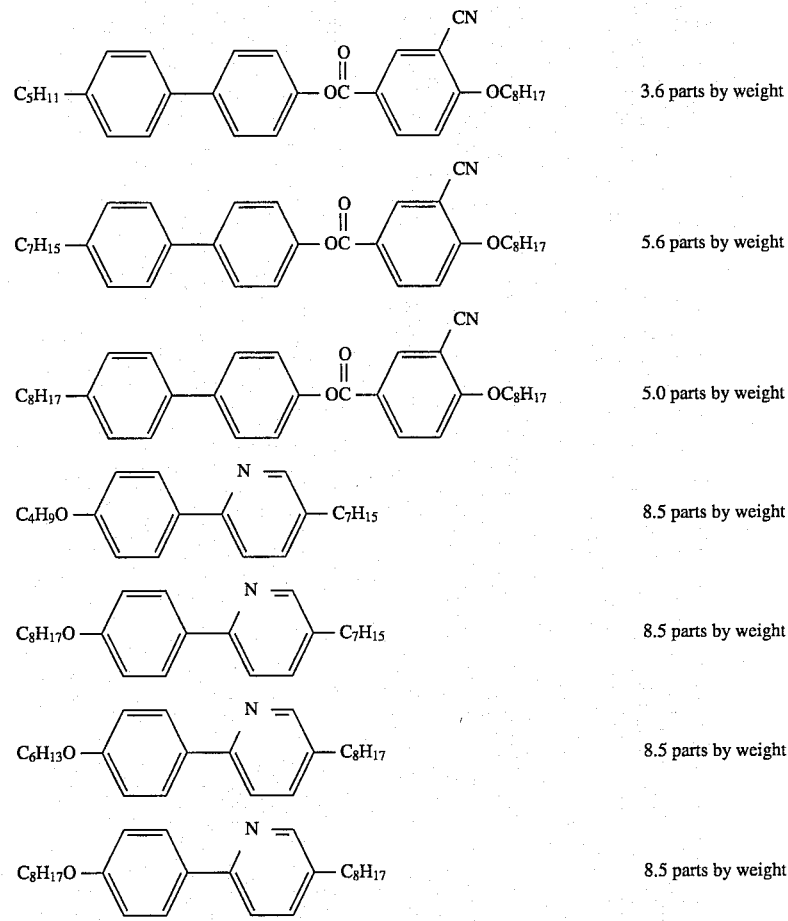

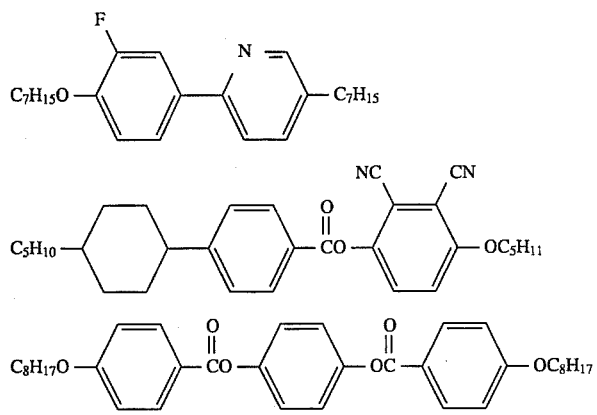

| | | 22.7 parts by weight |
| | | 3.8 parts by weight |
| | | 3.0 parts by weight |

The phase transition temperatures and the dielectric anisotropy (Δε) of the above composition (c) are shown below.

Cr −12° C. SC 68.2° C. SA 73.0° C. N 76.5° C. Iso Δε: −3.5

Comparative Example 2

The following optically active compounds were mixed with the smectic C liquid crystal mixture (c) of Comparative example 1 to prepare a ferroelectric liquid crystal composition (d):

| Mixture (c) | 97 wt. % |
| Compound No. (III-1) | 2 wt. % |
| Compound No. (III-4) | 1 wt. % |

The phase transition temperatures, the spontaneous polarization (Ps), the tilt angle (θ), the response time (E) in the case where 20 V was impressed, the voltage (E min) in the pulse width of minimum value and the pulse width (τ min) of the minimum value; of the above composition (d) are shown below.

Phase transition temperatures:

| Cr −14° C. | SC* 68.2° C. | SA 71.4° C. | N 75.9° C. | Iso |
| | Ps | | 4.7 nCcm$^{-2}$ | |
| | θ | | 27.0° C. | |
| | Δε | | −3.4 | |
| | τ | | 250 μsec | |
| | E min | | 30 V/μm | |
| | τ min | | 128 μsec | |

When Example 2 is compared with Comparative example 2, the effectiveness of the present invention is evident.

Example 3

An optically active compounds was mixed with the smectic C liquid crystal mixture (a) of Example 1 in the following proportion, to prepare a ferroelectric liquid crystal composition (e):

| Mixture (a) | 98 wt. % |
| Compound No. (III-2) | 2 wt. % |

The phase transition temperatures, the spontaneous polarization (Ps), the tilt angle (θ), the response time (τ) in the case where 20 V was impressed, the voltage (E min) in the pulse width of minimum value and the pulse width (τ min) of the minimum value; of the above composition (d) are shown below.

Phase transition temperatures:

| Cr −24° C. | SC* 72.5° C. | SA 78.0° C. | N* 84.2° C. | Iso |
| | Ps | | 14.0 nCcm$^{-2}$ | |
| | θ | | 32.3° | |
| | Δε | | −5.0 | |
| | τ | | 80 μsec | |
| | E min | | 17 V/μm | |
| | τ min | | 43 μsec | |

Example 4

A smectic C liquid crystal mixture (f) having the following composition was prepared.

| Compound No. (I-2) | 5 wt. % |
| Compound No. (I-3) | 10 wt. % |
| Compound No. (I-4) | 10 wt. % |
| Compound No. (I-9) | 5 wt. % |
| Compound No. (I-13) | 5 wt. % |
| Compound No. (II-5) | 20 wt. % |
| Compound No. (II-6) | 20 wt. % |
| Compound No. (II-7) | 20 wt. % |
| Compound No. (II-8) | 5 wt. % |

The phase transition temperatures and the dielectric anisotropy (Δε) of the above composition (f) are shown below.

Phase transition temperature:

Cr −16° C. SC 71.0° C. SA 75.1° C. N 80.6° C. Iso Δε: −3.7

Example 5

Optically active compounds were mixed with the smectic C liquid crystal mixture (f) of Example 4 in the following proportions, to prepare a ferroelectric liquid crystal composition (g):

| Mixture (f) | 88 wt. % |
|---|---|
| Compound No. (III-1) | 6 wt. % |
| Compound No. (III-4) | 6 wt. % |

The phase transition temperatures, the spontaneous polarization (Ps), the tilt angle (θ), the response time (τ) in the case where 20 V was impressed, the voltage (E min) in the pulse width of minimum value and the pulse width (τ min) of the minimum value, of the above composition (g) are shown below.

Phase transition temperatures:

| Cr | SC* 66.1° C. | SA 70.1° C. | N* 75.6° C. Iso |
|---|---|---|---|
| | Ps | | 10.4 nCcm$^{-2}$ |
| | θ | | 29.2° |
| | Δε | | −4.6 |
| | τ | | 90 μsec |
| | E min | | 17 V/μm |
| | τ min | | 50 μsec |

Example 6

A smectic C liquid crystal mixture (h) having the following composition was prepared.

| Compound No. (I-3) | 2 wt. % |
|---|---|
| Compound No. (I-9) | 8 wt. % |
| Compound No. (II-5) | 30 wt. % |
| Compound No. (II-6) | 30 wt. % |
| Compound No. (II-7) | 30 wt. % |

The phase transition temperatures and the dielectric anisotropy (Δε) of the above composition (h) are shown below.

Cr −5° C. SC 49.6° C. SA 59.3° C. N 60.4° C. Iso Δε: −3.5

Example 7

The following optically active compounds were mixed with the smectic C liquid crystal mixture (h) of Example 6 in the following proportions, to prepare a ferroelectric liquid crystal composition (i):

| Mixture (h) | 97 wt. % |
|---|---|
| Compound No. (III-1) | 2 wt. % |
| Compound No. (III-4) | 1 wt. % |

The phase transition temperatures, the spontaneous polarization (Ps), the tilt angle (θ), the response time (τ) in the case where 20 V was impressed, the voltage (E min) in the pulse width of minimum value and the pulse width (τ min) of the minimum value, of the above composition (i) are shown below.

Phase transition temperatures:

| Cr −7° C. | SC* 49.1° C. | SA 57.8° C. | N* 59.2° C. Iso |
|---|---|---|---|
| | Ps | | 3.8 nCcm$^{-2}$ |
| | θ | | 23.1° |
| | Δε | | −4.2 |
| | τ | | 65 μsec |
| | E min | | 13 V/μm |
| | τ min | | 30 μsec |

Example 8

A smectic C liquid crystal mixture (j) having the following composition was prepared.

| Compound No. (I-2) | 10 wt. % |
|---|---|
| Compound No. (I-4) | 15 wt. % |
| Compound No. (I-9) | 20 wt. % |
| Compound No. (II-5) | 18 wt. % |
| Compound No. (II-6) | 18 wt. % |
| Compound No. (II-7) | 19 wt. % |

The phase transition temperatures and the dielectric anisotropy (Δε) of the above composition (j) are shown below.

Phase transition temperature:

Cr −10° C. SC 69.5° C. SA 82.5° C. N 89.2° C. Iso Δε: −5.3

Example 9

The following optically active compounds were mixed with the smectic C liquid crystal mixture (j) of Example 8 in the following proportions, to prepare a ferroelectric liquid crystal composition (k):

| Mixture (j) | 95 wt. % |
|---|---|
| Compound No. (III-1) | 3 wt. % |
| Compound No. (III-4) | 2 wt. % |

The phase transition temperatures, the spontaneous polarization (Ps), the tilt angle (θ), the response time (τ) in the case where 20 V was impressed, the voltage (E min) in the pulse width of minimum value and the pulse width (τ min) of the minimum value, of the above composition (k) are shown below.

Phase transition temperatures:

| Cr −15° C. | SC* 67.3° C. | SA 85.4° C. | N* 90.9° C. Iso |
|---|---|---|---|
| | Ps | | 5.7 nCcm$^{-2}$ |
| | θ | | 26.2° |
| | Δε | | −5.1 |
| | τ | | 63 μsec |
| | E min | | 15 V/μm |
| | τ min | | 35 μsec |

Example 10

A smectic C liquid crystal mixture (1) having the following composition was prepared.

| Compound No. (I-3) | 8 wt. % |
|---|---|
| Compound No. (I-9) | 32 wt. % |
| Compound No. (II-2) | 30 wt. % |
| Compound No. (II-3) | 30 wt. % |

The phase transition temperatures and the dielectric anisotropy (Δε) of the above composition (1) are shown below.

Cr 8° C. SC 80.3° C. SA 86.9° C. N 94.2° C. Iso Δε: −3.9

Example 11

A smectic C liquid crystal mixture (m) having the following composition was prepared.

| Compound No. (I-13) | 10 wt. % |
|---|---|
| Compound No. (I-17) | 5 wt. % |
| Compound No. (I-2) | 5 wt. % |
| Compound No. (I-3) | 10 wt. % |
| Compound No. (I-4) | 10 wt. % |
| Compound No. (II-5) | 20 wt. % |
| Compound No. (II-6) | 20 wt. % |
| Compound No. (II-8) | 5 wt. % |
| Compound No. (II-7) | 15 wt. % |

Cr −16° C.  SC 74° C.  SA 78° C.  N 86° C.  Iso

Example 12

Using the liquid crystal composition m of Example 11 and optically active compounds shown in Table 7, liquid crystal compositions n and o having compositions shown in Table 8 were prepared. The phase transition temperatures of the prepared compositions are shown in Table 9.

TABLE 7

Structures of chiral compounds

Compound 10
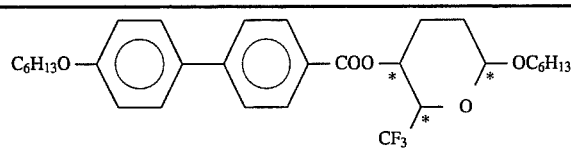

Compound 11
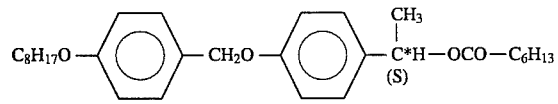

Compound 12
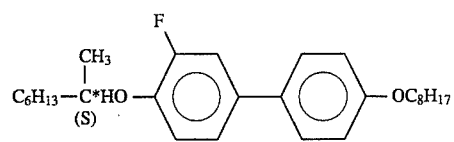

TABLE 8

Composition of compositions n and o

| No. | Content (wt. %) | |
|---|---|---|
| | Composition n | Composition o |
| Composition m | 96 | 96 |
| Compound 10 | 2 | |
| Compound 11 | 2 | |
| Compound 12 | | 2 |

TABLE 9

Phase transition temperatures of composition n and o (°C.)

| No. | Cr | SC | SA | N | Iso |
|---|---|---|---|---|---|
| Composition n | −16 | 68 | 75 | 83 | |
| Composition o | −16 | 70 | 76 | 83 | |

Example 13

Transparent electrodes consisting of ITO of 100 nm were formed on two glass substrates, followed by forming an insulating film consisting of $SiO_2$ of 100 nm on the transparent electrodes, coating a polyimide aligning film PSI-A-SP07 having a film thickness of 50 nm on the insulating film and carrying out rubbing treatment. The two glass substrates were laminated in a cell thickness of 50 μm so that the rubbing directions could be anti-parallel, followed by filling a nematic liquid crystal E-8 (made by Merck Co., Ltd.).

The pretilt angle of the aligning film PSI-A-SP07 was measured according to magnetic field capacity method (K. Suzuki, K. Toriyama and A. Fukuhara, Appl. Phys. Lett. 33, 561 (1987), to give 5°.

Example 14

Transparent electrodes consisting of ITO of 100 nm were formed on two glass substrates, followed by forming an insulating film consisting of $SiO_2$ of 100 nm on the transparent electrodes, coating a polyimide aligning film PSI-A-SP07 in a film thickness of 50 nm on the insulating film and carrying out rubbing treatment. Next, the two glass substrates were laminated in a cell thickness of 2 μm so that the rubbing directions could be parallel, followed by filling the ferroelectric liquid crystal composition prepared in Example 3, once heating the cell at a temperature at which the liquid crystal composition was changed to an isotropic liquid, and then cooling it down to room temperature at a rate of 1° C./min., to obtain a ferroelectric liquid crystal element having C2 alignment over the whole surface in pixels.

This ferroelectric liquid crystal element was placed between two perpendicularly crossed polarizing sheets and a voltage was impressed, to evaluate its characteristics. The evaluation conditions and the resulting characteristics are shown in Table 10. Further, the τ–V characteristic of this ferroelectric liquid crystal element was evaluated. The results are shown in FIGS. 12.and 13. As apparent from these figures, V min was obtained at 35 V and 30 V.

TABLE 10

Characteristics of compositions n and o

| Composition | C2T/% | Memory angle/° | Tilt angle/° | Memory pulse width/μs | Response speed/μs 0–50 | 0–90 | 10–90 | τ-V Vmin/V | Spontaneous polarization /nC/cm² |
|---|---|---|---|---|---|---|---|---|---|
| Composition n | 100 | 16 | 27 | 190 | 64 | 100 | 62 | 35 | –6 |
| Composition o | 100 | 15 | 27 | 220 | 68 | 105 | 66 | 30 | –4 |

Measuring temperature: 30° C.

C2T: Ratio of C2T alignment in the optical field of microscope

Memory pulse width: Pulse width of phase-stable pulse of ±5 V/μm exhibiting a bistable switching Response speed: Times at which the transmitted lights of 0–50, 0–90, 10–90% were changed in the case where a square wave of ±5 V/μm and 250 Hz was impressed.

V min: Minimum value of voltage at τ–V characteristic

Example 15

Using the ferrolectric liquid crystal element prepared in Example 5 and using the driving waveform shown in FIGS. 7, 8 and 9, the element was driven. Driving conditions and the driving results are shown in Tables 11 and 12. Switching was possible at a driving voltage of 40 V or lower and a good contrast was obtained.

TABLE 11

Driving characteristics of composition n (30° C.)

| Driving waveform | Pulse width | Selected voltage | Non-selected voltage | Bias voltage | Line address time |
|---|---|---|---|---|---|
| A | 20 μs | 25.0 V | 40.0 V | 7.5 V | 80 μs |
| B | 7 μs | 26.0 V | 40.0 V | 7.0 V | 98 μs |
| C | 11 μs | 21.0 V | 40.0 V | 9.5 V | 44 μs |

TABLE 12

Driving characteristics of composition o (30° C.)

| Driving waveform | Pulse width | Selected voltage | Non-selected voltage | Bias voltage | Line address time |
|---|---|---|---|---|---|
| A | 28 μs | 25.0 V | 40.0 V | 7.5 V | 112 μs |
| B | 9 μs | 27.0 V | 40.0 V | 6.5 V | 126 μs |
| C | 18 μs | 20.0 V | 40.0 V | 10.0 V | 72 μs |

Comparative Example 1

Transparent electrodes consisting of ITO of 100 nm were formed on two glass substrates, followed by forming an insulating film consisting of $SiO_2$ of 100 nm on the transparent electrodes, coating a polyimide film, aligned PSI-A-SP07, in a film thickness of 50 nm on the insulating film and carrying out rubbing treatment. Next, these two glass substrates were laminated in a cell thickness of 2 μm so that the rubbing directions could be parallel, followed by filling ferroelectric liquid crystal compositions made by Merck Co., Ltd. (SCE8 and ZLI-5014-000)shown in Table 13, once heating the cell at a temperature at which the liquid crystal compositions were converted into isotropic liquid, and then cooling down to room temperature at a rate of 1° C./min, to obtain a ferroelectric liquid crystal element having C2 alignment over the total surface in pixel.

TABLE 13

Phase transition temperature of ferroelectric liquid crystal composition (°C.)

| No. | $C_r$ | SC | SA | N | $I_{Iso}$ |
|---|---|---|---|---|---|
| SCE8 | · <–20 | · 58 | · 78 | · 98 | · |
| ZLI-5014-000 | · <–10 | · 64 | · 68 | · 70 | · |

This ferroelectric liquid crystal element was placed between two perpendicularly crossed polarizing sheets, followed by impressing a voltage to evaluate its characteristics. The evaluation conditions and the resulting characteristics are shown in Table 14.

TABLE 14

| | | | | | | | | | |
|---|---|---|---|---|---|---|---|---|---|
| Various characteristics of ferroelectric liquid crystal compositions | | | | | | | | | |
| | | Memory | Tilt | Memory pulse | Response speed/μs | | | τ-V | Spontaneous polarization |
| No. | C2T/% | angle/° | angle/° | width/μs | 0–50 | 0–90 | 10–90 | Vmin/V | /nC/cm² |
| SCE8 | 100 | 13 | 18 | 400 | 156 | 268 | 193 | 45 | +7 |
| ZLI-5014-000 | 100 | 13 | 21 | >5000 | 87 | 236 | 210 | 50 | –3 |

Measured temperature: 30° C.

C2T: Proportion of C2T alignment within the field of vision of microscope

Memory pulse width: Pulse width of phase-stable pulse of ±5 V/μm exhibiting a bistable switching Response speed: Times at which the transmitted lights of 0–50, 0–90 and 10–90% were changed in the case where a square wave of ±5 V/μm and 250 Hz was impressed V min: Minimum value of voltage at τ–V characteristic Further, the τ–V characteristic of this ferroelectric liquid crystal element was evaluated. The results are shown in FIGS. 14 and 15. τ–V min was obtained, but the value of V min was 45 V and 50 V.

Comparative Example 2

Driving was carried out using the ferroelectric liquid crystal element prepared in Comparative example 1 and using the driving waveforms shown in FIGS. 7, 8 and 9. The driving conditions and the driving results are shown in, Tables 15 and 16. For the driving voltage, 50 V was required.

TABLE 15

Driving characteristics of SCE8 (30° C.)

| Driving waveform | Pulse width | Selected voltage | Non-selected voltage | Bias voltage | Line address time |
|---|---|---|---|---|---|
| A | 37 μs | 40.0 V | 50.0 V | 5.0 V | 148 μs |
| B | 15 μs | 40.0 V | 50.0 V | 5.0 V | 210 μs |
| C | 22 μs | 30.0 V | 50.0 V | 10.0 V | 88 μs |

TABLE 16

Driving characteristics of ZLI-5014-000 (30° C.)

| Driving waveform | Pulse width | Selected voltage | Non-selected voltage | Bias voltage | Line address time |
|---|---|---|---|---|---|
| A | 39 μs | 30.0 V | 50.0 V | 10.0 V | 156 μs |
| B | 15 μs | 30.0 V | 50.0 V | 10.0 V | 210 μs |
| C | 14 μs | 25.0 V | 50.0 V | 12.5 V | 56 μs |

As seen from the above Examples, the present invention can provide a large capacity ferroelectric liquid crystal display element having a high speed response and a high contrast, by driving under a low voltage of 40 V or lower.

What is claimed is:

1. A smectic C liquid crystal composition comprising at least one of compound expressed by the formula (I)

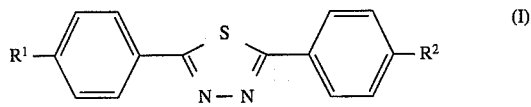

wherein $R^1$ and $R^2$ represent different linear alkyl groups of 1 to 9 carbon atoms, and at least one of compound expressed by the formula (II)

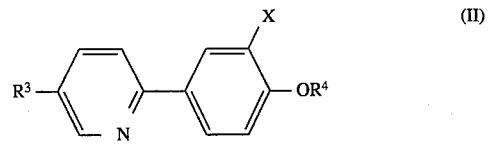

wherein $R^3$ and $R^4$ represent the same or different linear alkyl groups of 1 to 18 carbon atoms and X represents H or F.

2. A smectic C liquid crystal composition according to claim 1, wherein X of the formula (II) is F.

3. A smectic C liquid crystal composition according to claim 1 or claim 2, wherein the proportion of the compounds expressed by the formula (I) is 5 to 50% by weight based upon the total weight of the compounds expressed by the formula (I) and the compounds expressed by the formula (II).

4. A smectic C liquid crystal composition according to claim 1, wherein the phase transition range is in the order from the higher temperature side, isotropic phase, nematic phase, smectic A phase and smectic C phase.

5. A ferroelectric chiral smectic C liquid crystal composition, obtained by adding at least one optically active compound to the smectic C liquid crystal composition set forth in claim 1.

6. A ferroelectric chiral smectic C liquid crystal composition according to claim 5, wherein the mixing proportion of said optically active compound is 20% by weight or less based upon the weight of said smectic C liquid composition.

7. A ferroelectric chiral smectic C liquid crystal composition according to claim 5, wherein its Δε is negative and its absolute value is 2 or more.

8. A ferroelectric chiral smectic C liquid crystal composition according to claim 5, wherein its spontaneous polarization value is 10 nCcm⁻² or less.

9. A ferroelectric chiral smectic C liquid crystal composition according to claim 5, wherein said optically active compound is expressed by one of the formulas (III-A) to (III-I):

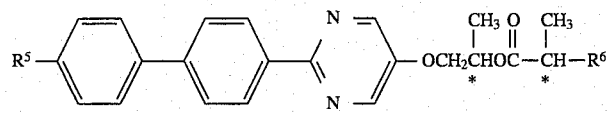 (III-A)

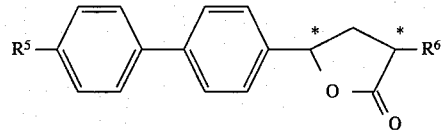 (III-B)

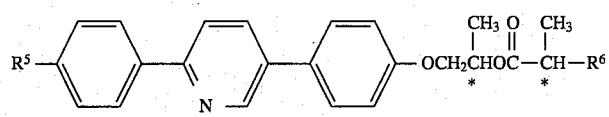 (III-C)

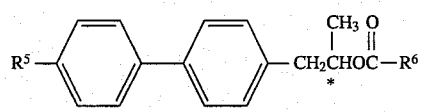 (III-D)

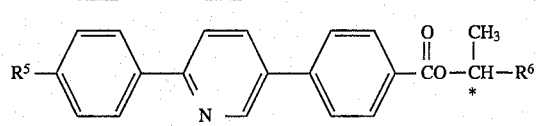 (III-E)

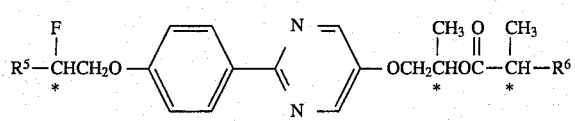 (III-F)

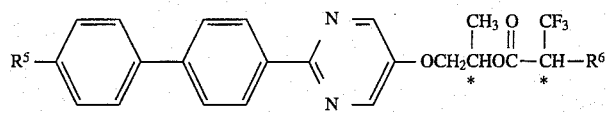 (III-G)

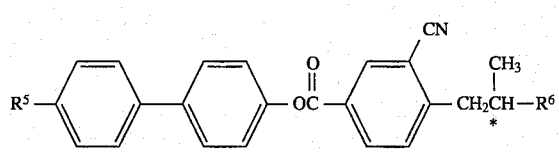 (III-H)

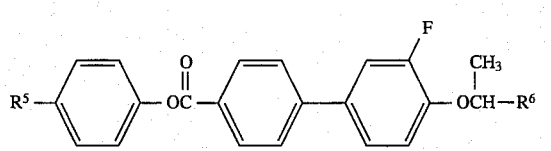 (III-I)

wherein $R^5$ and $R^6$ represent the same or different linear or branched alkyl group or alkoxy group of 2 to 18 carbon atoms and symbol * represents an asymmetric carbon atom.

10. A smectic C liquid crystal compound wherein $R^1$ and $R^2$ in the compounds expressed by the formula (I) set forth in claim 1 are those of linear alkyl groups each having lengths set forth in the following Table:

| $R^1$ | 5 | 6 | 6 | 7 | 8 | 8 | 8 |
|---|---|---|---|---|---|---|---|
| $R^2$ | 3 | 2 | 3 | 3 | 2 | 3 | 4 |

11. A liquid crystal display element wherein a ferroelectric chiral smectic C liquid crystal set forth in claim 5 is used.

12. A ferroelectric liquid crystal display element according to claim 11, wherein the direction of the bend of the smectic layer structure of said ferroelectric liquid crystal is the same as the pretilt direction of the liquid crystal molecules on the interface of the liquid crystal/the aligned film.

13. A ferroelectric liquid crystal display element according to claim 11 or 12, wherein the pretilt angle of liquid crystal molecules on the interface of the liquid crystal/the aligned film is 10° or less.

* * * * *